(12) United States Patent
Barker et al.

(10) Patent No.: US 10,115,966 B2
(45) Date of Patent: Oct. 30, 2018

(54) METALLATE ELECTRODES

(71) Applicant: FARADION LTD, Sheffield (GB)

(72) Inventors: Jeremy Barker, Oxford (GB); Richard Heap, Oxford (GB)

(73) Assignee: FARADION LTD, Sheffield (GB)

( * ) Notice: Subject to any disclaimer, the term of this patent is extended or adjusted under 35 U.S.C. 154(b) by 249 days.

(21) Appl. No.: 14/387,477

(22) PCT Filed: Mar. 21, 2013

(86) PCT No.: PCT/GB2013/050736
§ 371 (c)(1),
(2) Date: Sep. 23, 2014

(87) PCT Pub. No.: WO2013/140174
PCT Pub. Date: Sep. 26, 2013

(65) Prior Publication Data
US 2015/0037679 A1    Feb. 5, 2015

(30) Foreign Application Priority Data
Mar. 23, 2012 (GB) .................................. 1205170.2

(51) Int. Cl.
*H01M 4/485* (2010.01)
*H01M 4/525* (2010.01)
(Continued)

(52) U.S. Cl.
CPC .......... *H01M 4/485* (2013.01); *C01G 45/006* (2013.01); *C01G 49/009* (2013.01);
(Continued)

(58) Field of Classification Search
CPC ...... H01M 4/485; H01M 4/525; H01M 4/505; H01M 4/131
See application file for complete search history.

(56) References Cited

U.S. PATENT DOCUMENTS 6,447,739 B1    9/2002    Krynitz et al.
6,872,492 B2    3/2005    Barker et al.
(Continued)

FOREIGN PATENT DOCUMENTS

CN    1225045 C    10/2005
CN    1950962 A    4/2007
(Continued)

OTHER PUBLICATIONS

Yuan, Dingding et al., A Honeycomb-Layered Na3Ni2SbO6: A High-Rate and Cycle-Stable Cathode for Sodium-Ion Batteries, Sep. 18, 2014, Advanced Materials, 26, pp. 6301-6306.*
(Continued)

*Primary Examiner* — Karie O'Neill Apicella
(74) *Attorney, Agent, or Firm* — Meunier Carlin & Curfman LLC

(57) ABSTRACT

The invention relates to electrodes that contain active materials of the formula: $A_aM_bX_xO_y$, wherein A is one or more alkali metals selected from lithium, sodium and potassium; M is selected from one or more transition metals and/or one or more non-transition metals and/or one or more metalloids; X comprises one or more atoms selected from niobium, antimony, tellurium, tantalum, bismuth and selenium; and further wherein $0<a\leq6$; b is in the range: $0<b\leq4$; x is in the range $0<x\leq1$ and y is in the range $2\leq y\leq10$. Such electrodes are useful in, for example, sodium and/or lithium ion battery applications.

15 Claims, 28 Drawing Sheets

(51) Int. Cl.
 *H01M 4/505*  (2010.01)
 *H01M 4/131*  (2010.01)
 *C01G 45/00*  (2006.01)
 *C01G 49/00*  (2006.01)
 *C01G 53/00*  (2006.01)
 *H01M 4/58*  (2010.01)
 *C01G 51/00*  (2006.01)
 *H01M 10/052*  (2010.01)
 *H01M 10/054*  (2010.01)

(52) U.S. Cl.
 CPC ......... *C01G 51/006* (2013.01); *C01G 53/006* (2013.01); *H01M 4/131* (2013.01); *H01M 4/505* (2013.01); *H01M 4/525* (2013.01); *H01M 4/5825* (2013.01); *C01P 2002/52* (2013.01); *C01P 2002/72* (2013.01); *C01P 2006/40* (2013.01); *H01M 10/052* (2013.01); *H01M 10/054* (2013.01)

(56) References Cited

U.S. PATENT DOCUMENTS

| | | | |
|---|---|---|---|
| 2005/0058903 A1 | 3/2005 | Eylem | |
| 2007/0218370 A1 | 9/2007 | Deguchi et al. | |
| 2009/0081549 A1 | 3/2009 | Liaw et al. | |
| 2010/0209779 A1 | 8/2010 | Wendman | |
| 2010/0248001 A1* | 9/2010 | Kuze | C01G 49/0027 429/144 |
| 2011/0086273 A1 | 4/2011 | Ravet et al. | |

FOREIGN PATENT DOCUMENTS

| | | | |
|---|---|---|---|
| CN | 101 219 811 B | 6/2010 | |
| CN | 101855173 A | 10/2010 | |
| CN | 102341941 | 2/2012 | |
| EP | 0 583 772 A1 | 2/1994 | |
| EP | 0630064 A1 * | 12/1994 | ........... H01M 4/485 |
| EP | 1 708 296 A1 | 10/2006 | |
| EP | 2 328 215 A2 | 6/2011 | |
| JP | S58-172869 | 11/1983 | |
| JP | 2002 050401 A | 2/2002 | |
| JP | 2007 258094 A | 10/2007 | |
| JP | 2008-509527 | 3/2008 | |
| JP | 2009 295290 A | 12/2009 | |
| JP | 2014-523084 | 9/2014 | |
| WO | 2008/103666 A1 | 8/2008 | |
| WO | 2010107084 A1 | 9/2010 | |
| WO | 2011089958 A1 | 7/2011 | |

OTHER PUBLICATIONS

Fernanda M. Costa et al., "Preparation and characterization of $KTa_{0.9}Fe_{0.1}O_3$—δ perovskite electrodes," *Journal of Solid State Electrochemistry*, vol. 5, Issue 7-8, pp. 495-501 (Oct. 2001).

Search Report issued in connection with Chinese Application No. 201380016179.3, dated Dec. 22, 2015.

First Office Action issued in connection with Chinese Application No. 201380016179.3, dated Dec. 30, 2015.

Communication Pursuant to Article 94(3) EPC, dated Jan. 8, 2016, in European Application No. EP13721013.4.

First Office Action issued in connection with Japanese Application No. 2015-500987, dated Dec. 13, 2016.

Third Office Action issued in connection with Chinese Application No. 201380016179.3, dated Jan. 25, 2017.

* cited by examiner (Bottom to top) XRD of $Na_3Ni_2SbO_6$ (X0221), $Na_3Ni_{1.75}Mg_{0.25}SbO_6$ (X0372), $Na_3Ni_{1.50}Mg_{0.50}SbO_6$ (X0336), $Na_3Ni_{1.25}Mg_{0.75}SbO_6$ (X0373)

METALLATE ELECTRODES

FIELD OF THE INVENTION

The present invention relates to electrodes that contain an active material comprising a metallate group, and to the use of such electrodes, for example in sodium and lithium ion battery applications. The invention also relates to certain novel materials and to the use of these materials, for example as an electrode material.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing power in a compact system by accumulating energy in the chemical bonds of the cathode, and they both charge and discharge via a similar reaction mechanism. When a sodium-ion (or lithium-ion battery) is charging, $Na^+$ (or $Li^+$) ions de-intercalate and migrate towards the anode. Meanwhile charge balancing electrons pass from the cathode through the external circuit containing the charger and into the anode of the battery. During discharge the same process occurs but in the opposite direction. Once a circuit is completed electrons pass back from the anode to the cathode and the $Na^+$ (or $Li^+$) ions travel back to the anode.

Lithium-ion battery technology has enjoyed a lot of attention in recent years and provides the preferred portable battery for most electronic devices in use today; however lithium is not a cheap metal to source and is too expensive for use in large scale applications. By contrast sodium-ion battery technology is still in its relative infancy but is seen as advantageous; sodium is much more abundant than lithium and researchers predict this will provide a cheaper and more durable way to store energy into the future, particularly for large scale applications such as storing energy on the electrical grid. Nevertheless a lot of work has yet to be done before sodium-ion batteries are a commercial reality.

From the prior art, for example in the Journal of Solid State Chemistry 180 (2007) 1060-1067, L. Viciu et al disclosed the synthesis, structure and basic magnetic properties of $Na_2Co_2TeO_6$ and $Na_3Co_2SbO_6$. Also in Dalton Trans 2012, 41, 572, Elena A. Zvereva et al disclosed the preparation, crystal structure and magnetic properties of $Li_3Ni_2SbO_6$. Neither of these documents discusses the use of such compounds as electrode materials in sodium- or lithium-ion batteries.

In a first aspect, the present invention aims to provide a cost effective electrode that contains an active material that is straightforward to manufacture and easy to handle and store. A further object of the present invention is to provide an electrode that has a high initial charge capacity and which is capable of being recharged multiple times without significant loss in charge capacity.

Therefore, the present invention provides an electrode that contains an active material of the formula:

$$A_aM_bX_xO_y$$

wherein

A is one or more alkali metals selected from lithium, sodium and potassium;

M is selected from one or more transition metals and/or one or more non-transition metals and/or one or more metalloids;

X comprises one or more atoms selected from niobium, antimony, tellurium, tantalum, bismuth and selenium; and further wherein $0<a\leq6$; b is in the range: $0<b\leq4$; x is in the range $0<x\leq1$ and y is in the range $2\leq y\leq10$.

In a preferred embodiment of an electrode of the above formula, one or more of a, b, x and y are integers, i.e. whole numbers. In an alternative embodiment, one or more of a, b, x and y are non-integers, i.e. fractions.

Preferably M comprises one or more transition metals and/or one or more non-transition metals and/or one or more metalloids selected from titanium, vanadium, chromium, molybdenum, tungsten, manganese, iron, osmium, cobalt, nickel, palladium, platinum, copper, silver, gold, zinc, cadmium, magnesium, calcium, beryllium, strontium, barium, aluminium and boron, and particularly preferred is an electrode containing an active material wherein M is selected from one or more of copper, nickel, cobalt, manganese, titanium, aluminium, vanadium, magnesium and iron.

The term "metalloids" as used herein is intended to refer to elements which have both metal and non-metal characteristics, for example boron.

We have found it advantageous that the electrode contains an active material wherein at least one of the one or more transition metals has an oxidation state of +2 and at least one of the one or more non-transition metals has an oxidation state of +2.

Other suitable electrodes contain an active material wherein at least one of the one or more transition metals has an oxidation state of either +2 or +3 and at least one of the one or more non-transition metals has an oxidation state of +3.

Preferred electrodes contain an active material of the formula: $A_aM_bSb_xO_y$, wherein A is one or more alkali metals selected from lithium, sodium and potassium and M is one or more metals selected from cobalt, nickel, manganese, titanium, iron, copper, aluminium, vanadium and magnesium.

Alternative preferred electrodes contain an active material of the formula: $A_aM_bTe_xO_y$, wherein A is one or more alkali metals selected from lithium, sodium and potassium and M is one or more metals selected from cobalt, nickel, manganese, titanium, iron, copper, aluminium, vanadium and magnesium.

As described above it is typical that a may be in the range $0<a\leq6$; b may be in the range: $0<b\leq4$; x may be in the range $0<x\leq1$ and y may be in the range $2\leq y\leq10$. Preferably, however, a may be in the range $0<a\leq5$; b may be in the range $0\leq b\leq3$; $0.5\leq x\leq1$; and y may be in the range $2\leq y\leq9$. Alternatively, a may be in the range $0<a\leq5$; b may be in the range $0<b\leq2$; x may be in the range $0<x\leq1$; and $2\leq y\leq8$. As mentioned above, one or more of a, b, x and y may be integers or non-integers.

Extremely beneficial electrochemical results are expected for electrodes that contain one or more active materials: $Na_3Ni_2SbO_6$, $Na_3Ni_{1.5}Mg_{0.5}SbO_6$, $Na_3Co_2SbO_6$, $Na_3Co_{1.5}Mg_{0.5}SbO_6$, $Na_3Mn_2SbO_6$, $Na_3Fe_2SbO_6$, $Na_3Cu_2SbO_6$, $Na_2AlMnSbO_6$, $Na_2AlNiSbO_6$, $Na_2VMgSbO_6$, $NaCoSbO_4$, $NaNiSbO_4$, $NaMnSbO_4$, $Na_4FeSbO_6$, $Na_{0.8}CO_{0.6}Sb_{0.4}O_2$, $Na_{0.8}Ni_{0.6}Sb_{0.4}O_4$, $Na_2Ni_2TeO_6$, $Na_2Co_2TeO_6$, $Na_2Mn_2TeO_6$, $Na_2Fe_2TeO_6$, $Na_3Ni_{2-z}Mg_zSbO_6$ ($0\leq z\leq 0.75$), $Li_3Ni_{1.5}Mg_{0.5}SbO_6$, $Li_3Ni_2SbO_6$, $Li_3Mn_2SbO_6$, $Li_3Fe_2SbO_6$, $Li_3Ni_{1.5}Mg_{0.5}SbO_6$, $Li_3Cu_2SbO_6$, $Li_3Co_2SbO_6$, $Li_2Co_2TeO_6$, $Li_2Ni_2TeO_6$, $Li_2Mn_2TeO_6$, $LiCoSbO_4$, $LiNiSba_t$, $LiMnSbO_4$, $Li_3CuSbO_5$, $Na_4NiTeO_6$, $Na_2NiSbO_5$, $Li_2NiSbO_5$, $Na_4Fe_3SbO_9$, $Li_4Fe_3SbO_9$, $Na_2Fe_3SbO_8$, $Na_5NiSbO_6$, $Li_5NiSbO_6$, $Na_4MnSbO_6$, $Li_4MnSbO_6$, $Na_3MnTeO_6$, $Li_3MnTeO_6$, $Na_3FeTeO_6$, $Li_3FeTeO_6$, $Na_4Fe_{1-z}(Ni_{0.5}Ti_{0.5})_zSbO_6$ $(0 \leq z \leq 1)$, $Na_4Fe_{0.5}Ni_{0.25}Ti_{0.25}SbO_6$, $Li_4Fe_{1-z}(Ni_{0.5}Ti_{0.5})_zSbO_6$ $(0 \leq z \leq 1)$, $Li_4Fe_{0.5}Ni_{0.25}Ti_{0.25}SbO_6$, $Na_4Fe_{1-z}(Ni_{0.5}Mn_{0.5})_zSbO_6$ $(0 \leq z \leq 1)$, $Na_4Fe_{0.5}Ni_{0.25}Mn_{0.25}SbO_6$, $Li_4Fe_{1-z}(Ni_{0.5}Mn_{0.5})_zSbO_6$ $(0 \leq z \leq 1)$, $Li_4Fe_{0.5}Ni_{0.25}Mn_{0.25}SbO_6$, $Na_{5-z}Ni_{1-z}Fe_zSbO_6$ $(0 \leq z \leq 1)$, $Na_{4.5}Ni_{0.5}Fe_{0.5}SbO_6$, $Li_{5-z}Ni_{1-z}Fe_zSbO_6$ $(0 \leq z \leq 1)$, $Li_{4.5}Ni_{0.5}Fe_{0.5}SbO_6$, $Na_3Ni_{1.75}Zn_{0.25}SbO_6$, $Na_3Ni_{1.75}Cu_{0.25}SbO_6$, $Na_3Ni_{1.50}Mn_{0.50}SbO_6$, $Li_4FeSbO_6$ and $Li_4NiTeO_6$.

It is convenient to use an electrode according to the present invention in an energy storage device, particularly an energy storage device for use as one or more of the following: a sodium and/or lithium ion and/or potassium cell, a sodium and/or lithium and/or potassium metal ion cell, a non-aqueous electrolyte sodium and/or lithium and/or potassium ion cell, an aqueous electrolyte sodium and/or lithium and/or potassium ion cell.

Electrodes according to the present invention are suitable for use in many different applications, for example energy storage devices, rechargeable batteries, electrochemical devices and electrochromic devices.

Advantageously, the electrodes according to the invention are used in conjunction with a counter electrode and one or more electrolyte materials. The electrolyte materials may be any conventional or known materials and may comprise either aqueous electrolyte(s) or non-aqueous electrolyte(s) or mixtures thereof.

In a second aspect, the present invention provides a novel material of the formula: $A_3Ni_{2-z}Mg_zSbO_6$, wherein A is one or more alkali metals selected from lithium, sodium and potassium and z is in the range $0<z<2$.

In a third aspect, the present invention provides a novel material of the formula: $Na_3Mn_2SbO_6$.

In a third aspect, the present invention provides a novel material of the formula: $Na_3Fe_2SbO_6$.

The active materials of the present invention may be prepared using any known and/or convenient method. For example, the precursor materials may be heated in a furnace so as to facilitate a solid state reaction process. Further, the conversion of a sodium-ion rich material to a lithium-ion rich material may be effected using an ion exchange process.

Typical ways to achieve Na to Li ion exchange include:
1. Mixing the sodium-ion rich material with an excess of a lithium-ion material e.g. $LiNO_3$, heating to above the melting point of $LiNO_3$ (264° C.), cooling and then washing to remove the excess $LiNO_3$;
2. Treating the Na-ion rich material with an aqueous solution of lithium salts, for example 1M LiCl in water; and
3. Treating the Na-ion rich material with a non-aqueous solution of lithium salts, for example LiBr in one or more aliphatic alcohols such as hexanol, propanol etc.

BRIEF DESCRIPTION OF THE DRAWINGS

The present invention will now be described with reference to the following drawings in which.

DETAILED DESCRIPTION

Figure 1A:
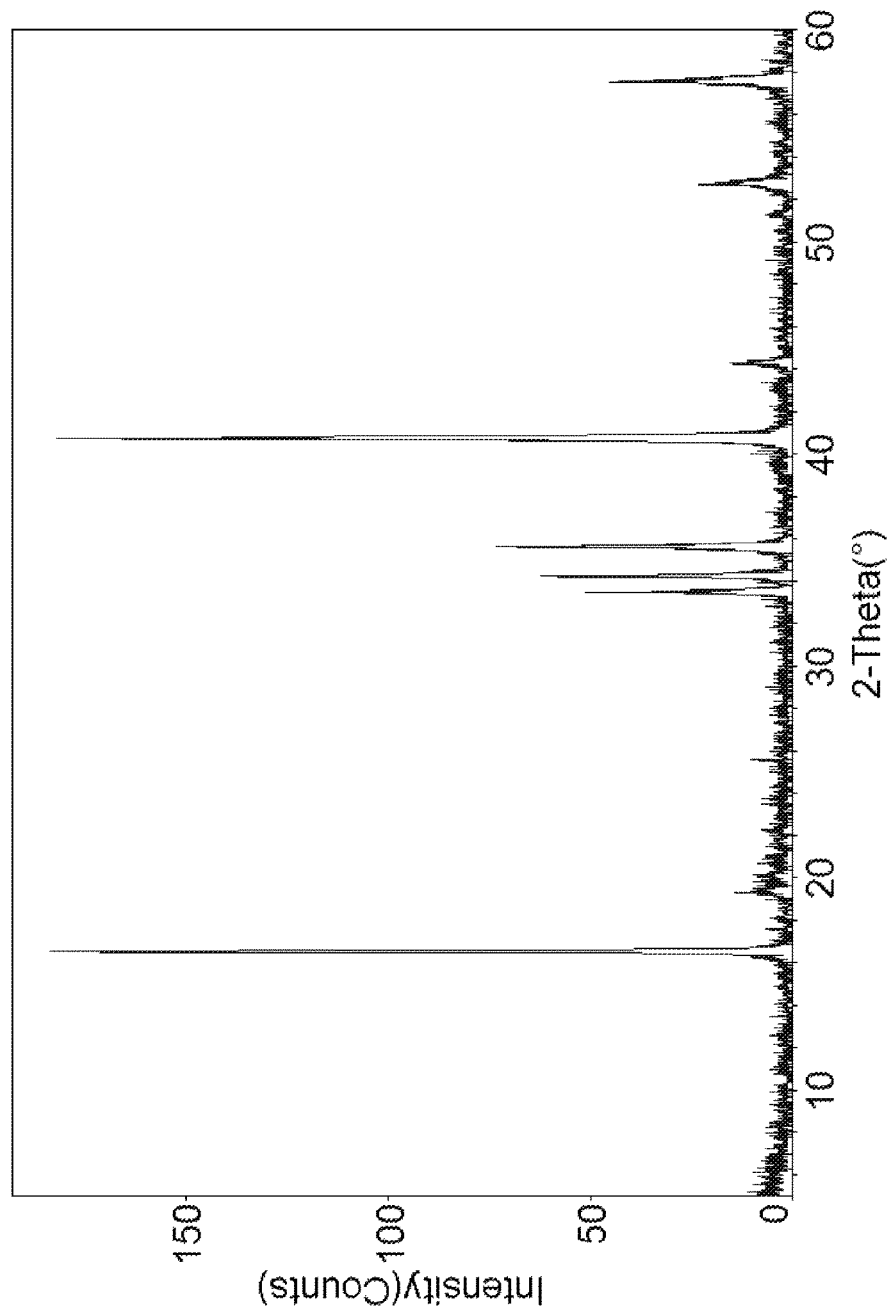
FIG. 1A is the XRD of $Na_3Ni_2SbO_6$ prepared according to Example 1.

Active materials used in the present invention are prepared on a laboratory scale using the following generic method:

Generic Synthesis Method:

The required amounts of the precursor materials are intimately mixed together. The resulting mixture is then heated in a tube furnace or a chamber furnace using either a flowing inert atmosphere (e.g. argon or nitrogen) or an ambient air atmosphere, at a furnace temperature of between 400° C. and 1200° C. until reaction product forms. When cool, the reaction product is removed from the furnace and ground into a powder.

Using the above method, active materials used in the present invention were prepared as summarised below in Examples 1 to 40

| EXAMPLE | TARGET COMPOUND (ID code) | STARTING MATERIALS | FURNACE CONDITIONS |
|---|---|---|---|
| 1 | $Na_3Ni_2SbO_6$ (X0328) | $Na_2CO_3$, $NiCO_3$, $Sb_2O_3$ | Air/800° C., dwell time of 8 hours. |
| 2 | $Na_3Co_2SbO_6$ (X0325) | $Na_2CO_3$, $CoCO_3$, $Sb_2O_3$ | Air/800° C., dwell time of 8 hours. |
| 3 | $Na_3Mn_2SbO_6$ (X0276) | $Na_2CO_3$, $MnCO_3$, $Sb_2O_3$ | $N_2$/800° C., dwell time of 8 hours. |
| 4 | $Na_3Fe_2SbO_6$ (X0240) | $Na_2CO_3$, $Fe_2O_3$, $Sb_2O_3$ | $N_2$/800° C., dwell time of 8 hours. |
| 5 | $Na_3Cu_2SbO_6$ (X0247) | $Na_2CO_3$, CuO, $Sb_2O_3$ | Air/800° C., dwell time of 8 hours |
| 6 | $Na_2AlMnSbO_6$ (X0232) | $Na_2CO_3$, $Al(OH)_3$, $MnCO_3$, $Sb_2O_3$ | Air/800° C., dwell time of 8 hours |
| 7 | $Na_2AlNiSbO_6$ (X0233) | $Na_2CO_3$, $Al(OH)_3$, $NiCO_3$, $Sb_2O_3$ | Air/800° C., dwell time of 8 hours |
| 8 | $Na_2VMgSbO_6$ (X0245) | $Na_2CO_3$, $V_2O_3$, $Mg(OH)_2$, $NaSbO_3 \cdot 3H_2O$ | $N_2$/800° C., dwell time of 8 hours |
| 9 | $NaCoSbO_4$ (X0253) | $Na_2CO_3$, $CoCO_3$, $Sb_2O_3 \cdot 3H_2O$ | Air/800° C., dwell time of 8 hours |
| 10 | $NaNiSbO_4$ (X0254) | $Na_2CO_3$, $NiCO_3$, $Sb_2O_3$ | Air/800° C., dwell time of 8 hours |
| 11 | $NaMnSbO_4$ (X0257) | $Na_2CO_3$, $MnCO_3$, $Sb_2O_3$ | Air/800° C., dwell time of 8 hours |
| 12 | $Na_4FeSbO_6$ (X0260) | $Na_2CO_3$, $Fe_2O_3$, $Sb_2O_3$ | Air/800° C., dwell time of 8 hours |
| 13 | $Na_{0.8}Co_{0.6}Sb_{0.4}O_2$ (X0263) | $Na_2CO_3$, $CoCO_3$, $Sb_2O_3$ | Air/800° C., dwell time of 8 hours |
| 14 | $Na_{0.8}Ni_{0.6}Sb_{0.4}O_4$ (X0264) | $Na_2CO_3$, $NiCO_3$, $Sb_2O_3$ | Air/800° C., dwell time of 8 hours |
| 15 | $Na_3Ni_{1.5}Mg_{0.5}SbO_6$ (X0336) | $Na_2CO_3$, $NiCO_3$, $Sb_2O_3$, $Mg(OH)_2$ | Air/800° C., dwell time of 14 hours |
| 16 | $Na_3Co_{1.5}Mg_{0.5}SbO_6$ (X0331) | $Na_2CO_3$, $CoCO_3$, $Sb_2O_3$, $Mg(OH)_2$ | Air/800° C., dwell time of 14 hours |
| 17 | $Li_3Ni_{1.5}Mg_{0.5}SbO_6$ (X0368) | $Li_2CO_3$, $NiCO_3$, $Sb_2O_3$, $Mg(OH)_2$ | Air/800° C., dwell time of 8 hours |
| 18 | $Li_3Co_2SbO_6$ (X0222) | $Na_2CO_3$, $CoCO_3$, $Sb_2O_3$ | Air/800° C., dwell time of 8 hours |

-continued

| EXAMPLE | TARGET COMPOUND (ID code) | STARTING MATERIALS | FURNACE CONDITIONS |
|---|---|---|---|
| 19 | $Li_3Ni_2SbO_6$ (X0223) | $Na_2CO_3$, $NiCO_3$, $Sb_2O_3$ | Air/800° C., dwell time of 8 hours |
| 20 | $Li_3Mn_2SbO_6$ (X0239) | $Na_2CO_3$, $MnCO_3$, $Sb_2O_3$ | Air/800° C., dwell time of 8 hours |
| 21 | $Li_3Fe_2SbO_6$ (X0241) | $Li_2CO_3$, $Fe_2O_3$, $Sb_2O_3$ | N2/800° C., dwell time of 8 hours |
| 22 | $Li_3Cu_2SbO_6$ (X0303) | $Li_2CO_3$, CuO, $Sb_2O_3$ | Air/800° C., dwell time of 8 hours |
| 23 | $LiCoSbO_4$ (X0251) | $Li_2CO_3$, $CoO_3$, $Sb_2O_3$ | Air/800° C., dwell time of 8 hours |
| 24 | $LiNiSbO_4$ (X0252) | $Li_2CO_3$, $NiCO_3$, $Sb_2O_3$ | Air/800° C., dwell time of 8 hours |
| 25 | $LiMnSbO_4$ (X0256) | $Li_2CO_3$, $MnCO_3$, $Sb_2O_3$ | Air/800° C., dwell time of 8 hours |
| 26 | $Li_3CuSbO_5$ (X0255) | $Li_2CO_3$, CuO, $Sb_2O_3$ | Air/800° C., dwell time of 8 hours |
| 27 | $Na_2Co_2TeO_6$ (X0216) | $Na_2CO_3$, $CoCO_3$, $TeO_2$ | Air/800° C., dwell time of 8 hours |
| 28 | $Na_2Ni_2TeO_6$ (X0217) | $Na_2CO_3$, $NiCO_3$, $TeO_2$ | Air/800° C., dwell time of 8 hours |
| 29 | $Na_2Mn_2TeO_6$ (X0234) | $Na_2CO_3$, $MnCO_3$, $TeO_2$ | Air/800° C. |
| 30 | $Na_2Fe_2TeO_6$ (X0236) | $Na_2CO_3$, $Fe_2O_3$, $TeO_2$ | $N_2$/800° C., dwell time of 8 hours |
| 31 | $Li_2Co_2TeO_6$ (X0218) | $Li_2CO_3$, $CoCO_3$, $TeO_2$ | Air/800° C., dwell time of 8 hours |
| 32 | $Li_2Ni_2TeO_6$ (X0219) | $Li_2CO_3$, $NiCO_3$, $TeO_2$ | Air/800° C., dwell time of 8 hours |
| 33 | $Li_2Mn_2TeO_6$ (X0235) | $Li_2CO_3$, $MnCO_3$, $TeO_2$ | Air/800° C., dwell time of 8 hours |
| 34 | $Na_3Ni_{2-z}Mg_zSbO_6$ | $Na_2CO_3$, $NiCO_3$, $Mg(OH)_2$, $Sb_2O_3$ | Air/800° C., dwell time of 8-14 hours |
| 34a | Z = 0.00 (X0221) = E.g. 1 | | |
| 34b | Z = 0.25 (X0372) | | |
| 34c | Z = 0.5 (X0336) = E.g. 15 | | |
| 34d | Z = 0.75 (X0373) | | |
| 35 | $Na_3Ni_{1.75}Zn_{0.25}SbO_6$ (X0392) | $Na_2CO_3$, $NiCO_3$, $Sb_2O_3$, ZnO | Air/800° C., dwell time of 8 hours |
| 36 | $Na_3Ni_{1.75}Cu_{0.25}SbO_6$ (X0393) | $Na_2CO_3$, $NiCO_3$, $Sb_2O_3$, CuO | Air/800° C., dwell time of 8 hours |
| 37 | $Na_3Ni_{1.50}Mn_{0.50}SbO_6$ (X0380) | $Na_2CO_3$, $NiCO_3$, $Sb_2O_3$, $MnO_2$ | Air/800° C., dwell time of 8 hours |
| 38 | $Li_4FeSbO_6$ (X1120A) | $Li_2CO_3$, $Fe_2O_3$, $Sb_2O_3$ | Air/800° C., dwell time of 8 hours followed by 800° C., for a further 8 hours |
| 39 | $Li_4NiTeO_6$ (X1121) | $Li_2CO_3$, $NiCO_3$, $TeO_2$ | Air/800° C., dwell time of 8 hours |
| 40 | $Na_4NiTeO_6$ (X1122) | $Na_2CO_3$, $NiCO_3$, $TeO_2$ | Air/800° C., dwell time of 8 hours |

Product Analysis Using XRD

All of the product materials were analysed by X-ray diffraction techniques using a Siemens D5000 powder diffractometer to confirm that the desired target materials had been prepared and to establish the phase purity of the product material and to determine the types of impurities present. From this information it is possible to determine the unit cell lattice parameters.

The general operating conditions used to obtain the XRD spectra are as follows:

Slits sizes: 1 mm, 1 mm, 0.1 mm
Range: 2θ=5°-60°
X-ray Wavelength=1.5418 Å) (Cu Kα)
Speed: 0.5 or 1.0 second/step
Increment: 0.015° or 0.025°

Electrochemical Results

The target materials were tested in a lithium metal anode test electrochemical cell to determine their specific capacity and also to establish whether they have the potential to undergo charge and discharge cycles. A lithium metal anode test electrochemical cell containing the active material is constructed as follows:

Generic Procedure to Make a Lithium Metal Test Electrochemical Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode. Metallic lithium on a copper current collector may be employed as the negative electrode. The electrolyte comprises one of the following: (i) a 1 M solution of $LiPF_6$ in ethylene carbonate (EC) and dimethyl carbonate (DMC) in a weight ratio of 1:1; (ii) a 1 M solution of $LiPF_6$ in ethylene carbonate (EC) and diethyl carbonate (DEC) in a weight ratio of 1:1; or (iii) a 1 M solution of $LiPF_6$ in propylene carbonate (PC) A glass fibre separator (Whatman, GF/A) or a porous polypropylene separator (e.g. Celgard 2400) wetted by the electrolyte is interposed between the positive and negative electrodes.

Generic Procedure to Make a Hard Carbon Na-Ion Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode.

The negative electrode is prepared by solvent-casting a slurry of the hard carbon active material (Carbotron P/J, supplied by Kureha), conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 84% active material, 4% Super P carbon, and 12% Kynar 2801 binder. Optionally, a copper current collector may be used to contact the negative electrode.

Generic Procedure to Make a Graphite Li-Ion Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode.

The negative electrode is prepared by solvent-casting a slurry of the graphite active material (Crystalline Graphite, supplied by Conoco Inc.), conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 92% active material, 2% Super P carbon, and 6% Kynar 2801 binder. Optionally, a copper current collector may be used to contact the negative electrode.

Cell Testing

The cells are tested as follows using Constant Current Cycling techniques.

The cell is cycled at a given current density between pre-set voltage limits. A commercial battery cycler from Maccor Inc. (Tulsa, Okla., USA) is used. On charge, sodium (lithium) ions are extracted from the active material. During discharge, sodium (lithium) ions are re-inserted into the active material.

Results:

$Na_3Ni_2SbO_6$ Prepared According to Example 1.

Figure 1B:
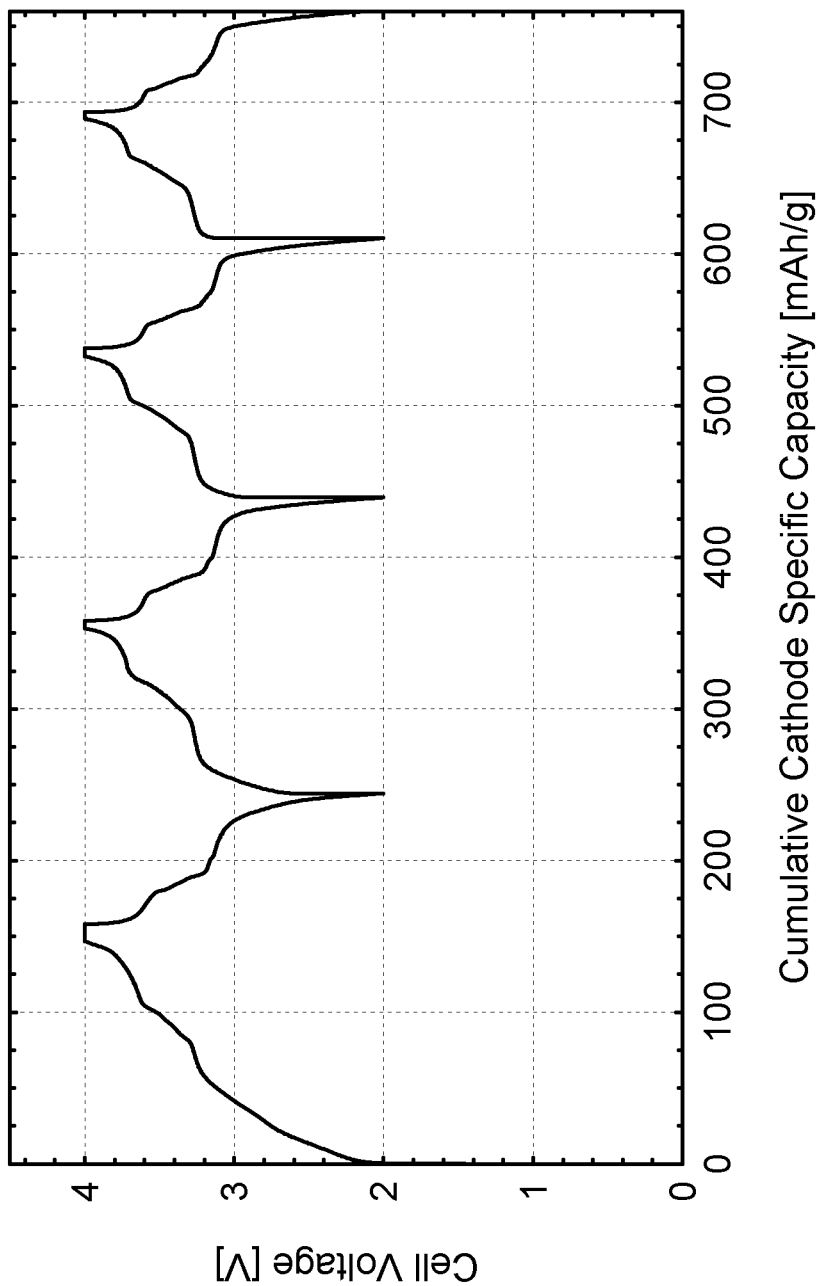
FIG. 1B shows the Constant current cycling (Cell Voltage versus Cumulative Cathode Specific Capacity) of a Na-ion cell: Hard Carbon//$Na_3Ni_2SbO_6$ prepared according to Example 1.
Figure 2:
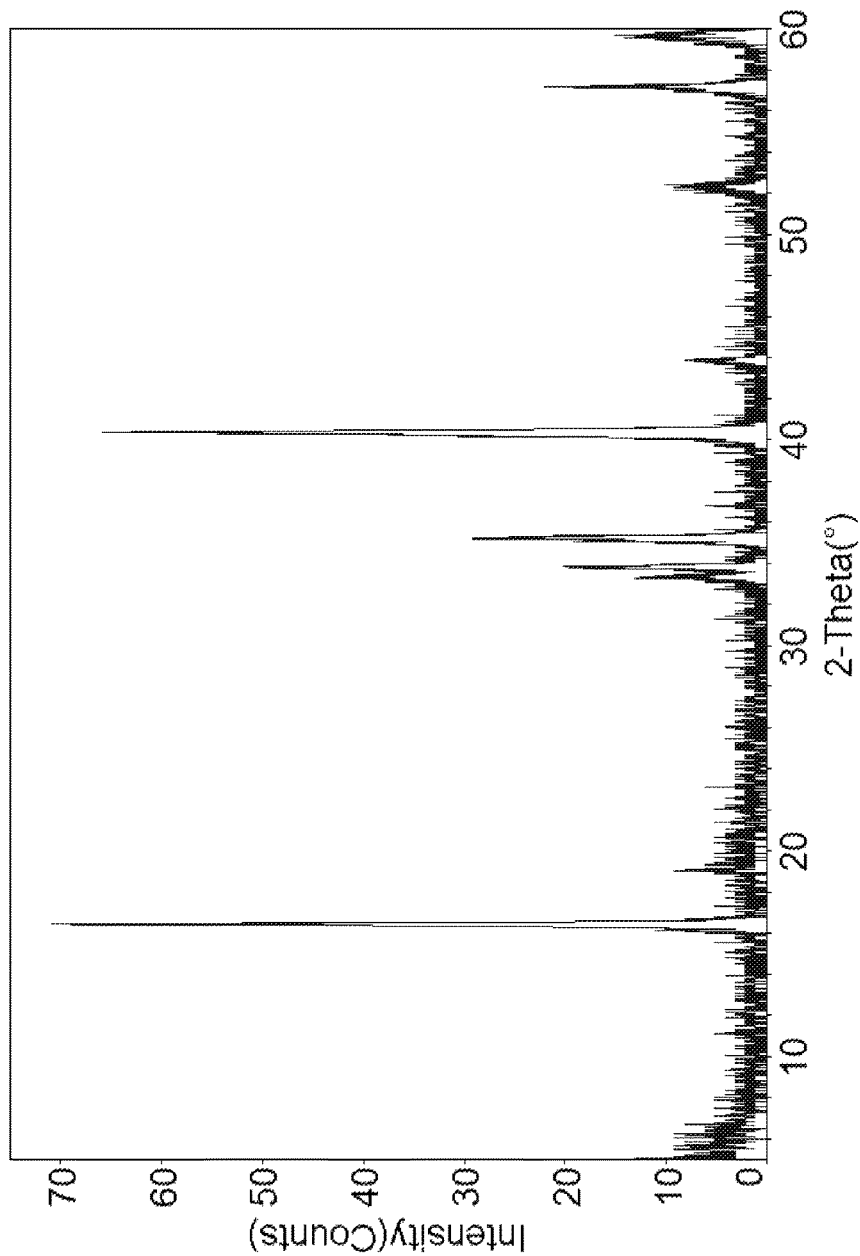
FIG. 2 is the XRD for $Na_3Co_2SbO_6$ prepared according to Example 2.
Figure 3:
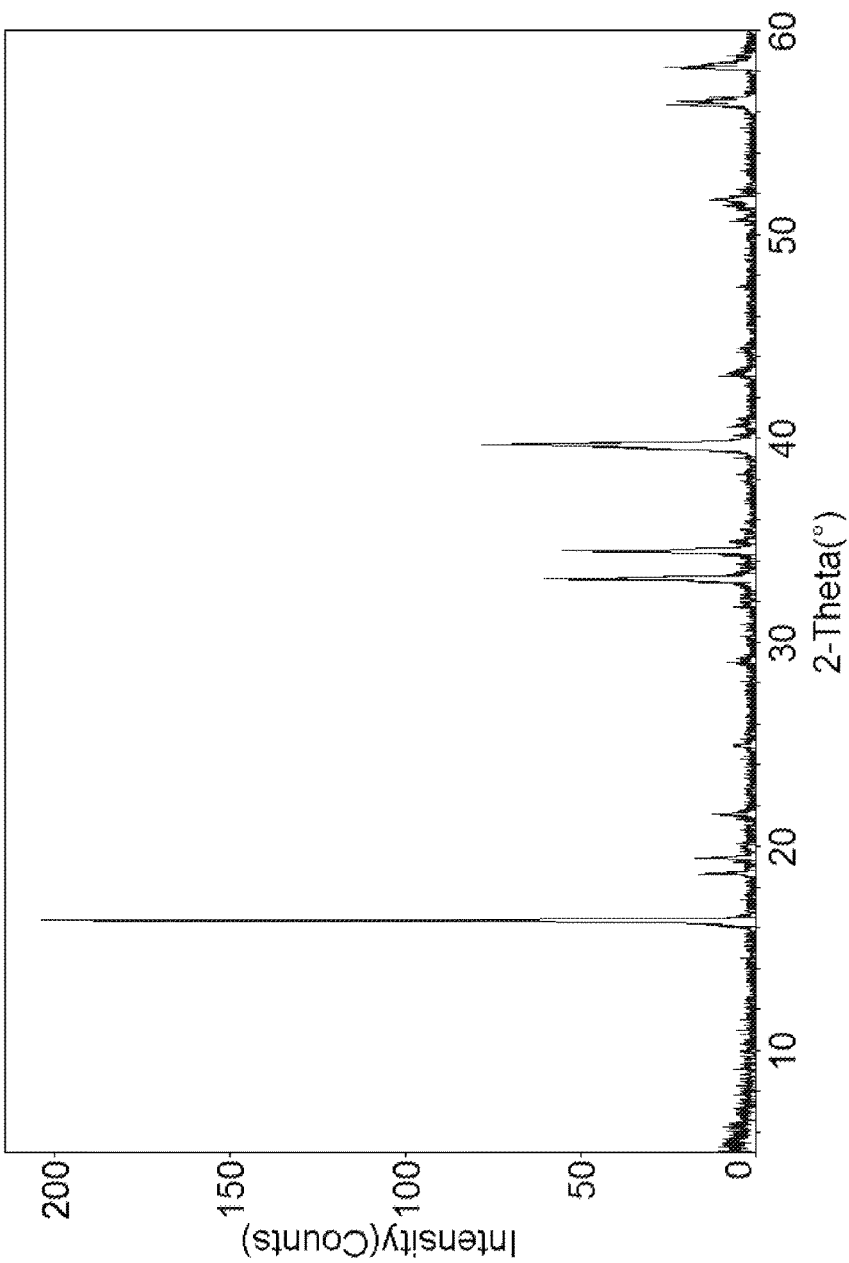
FIG. 3 is the XRD for $Na_3Mn_2SbO_6$ prepared according to Example 3.

Referring to FIG. 1B. The Cell #202071 shows the constant current cycling data for the $Na_3Ni_2SbO_6$ active material (X0328) made according to Example 1 in a Na-ion cell where it is coupled with a Hard Carbon (Carbotron P/J) anode material. The electrolyte used a 0.5 M solution of $NaClO_4$ in propylene carbonate. The constant current data were collected at an approximate current density of 0.05 mA/cm$^2$ between voltage limits of 1.80 and 4.00 V. To fully charge the cell the Na-ion cell was potentiostatically held at 4.0 V at the end of the constant current charging process. The testing was carried out at room temperature. It is shown that sodium ions are extracted from the cathode active material, $Na_3Ni_2SbO_6$, and inserted into the Hard Carbon anode during the initial charging of the cell. During the subsequent discharge process, sodium ions are extracted from the Hard Carbon and re-inserted into the $Na_3Ni_2SbO_6$ cathode active material. The first discharge process corresponds to a specific capacity for the cathode of 86 mAh/g, indicating the reversibility of the sodium ion extraction-insertion processes. The generally symmetrical nature of the charge-discharge curves further indicates the excellent reversibility of the system, and the low level of voltage hysteresis (i.e. the voltage difference between the charge and discharge processes) is extremely small, and this also indicates the excellent kinetics of the extraction-insertion reactions. This is an important property that is useful for producing a high rate active material.

$Na_3Cu_2SbO_6$ Prepared According to Example 22.

Figure 4A:
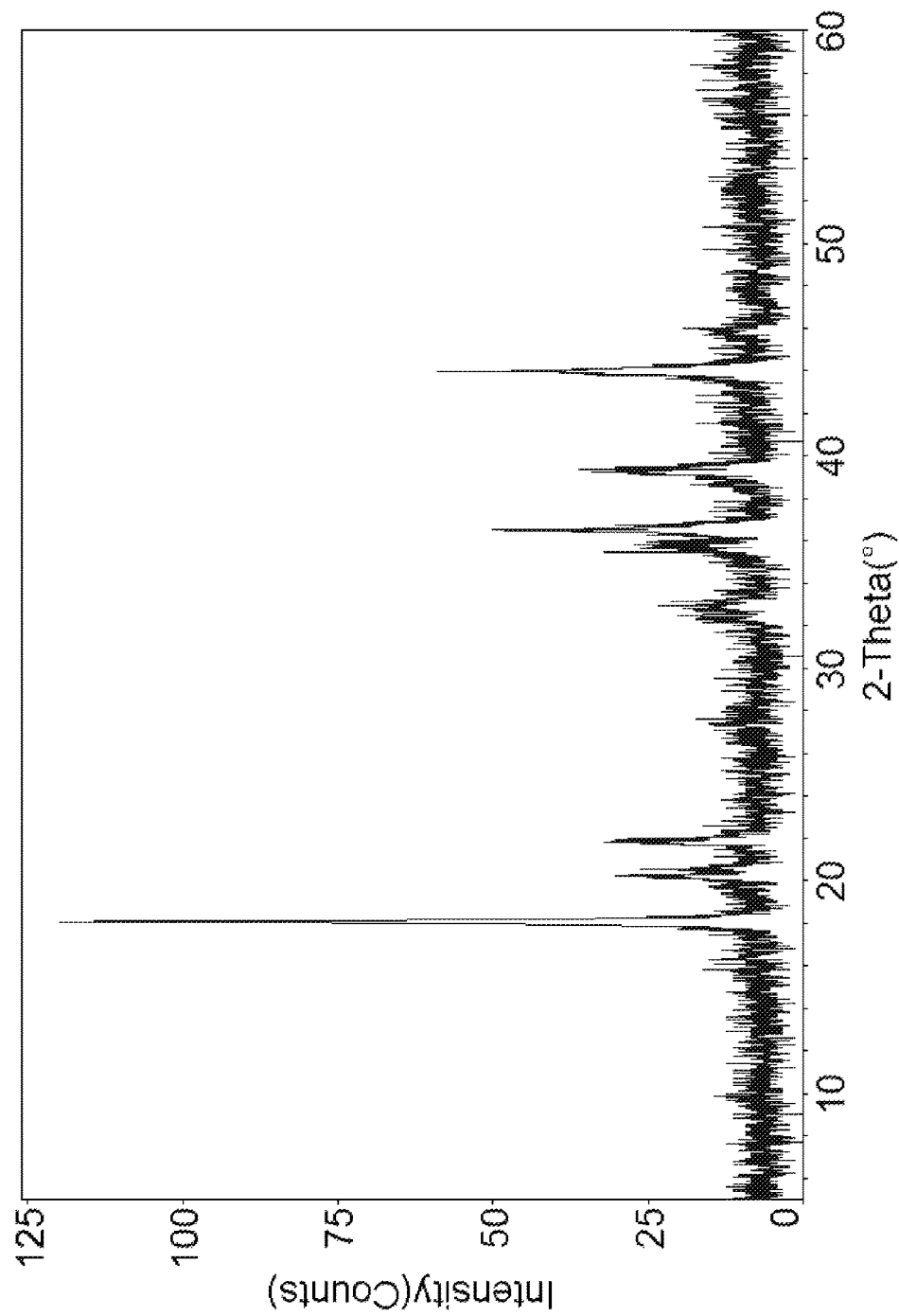
FIG. 4A is the XRD for $Li_3Cu_2SbO_6$ prepared according to Example 22.
Figure 4B:
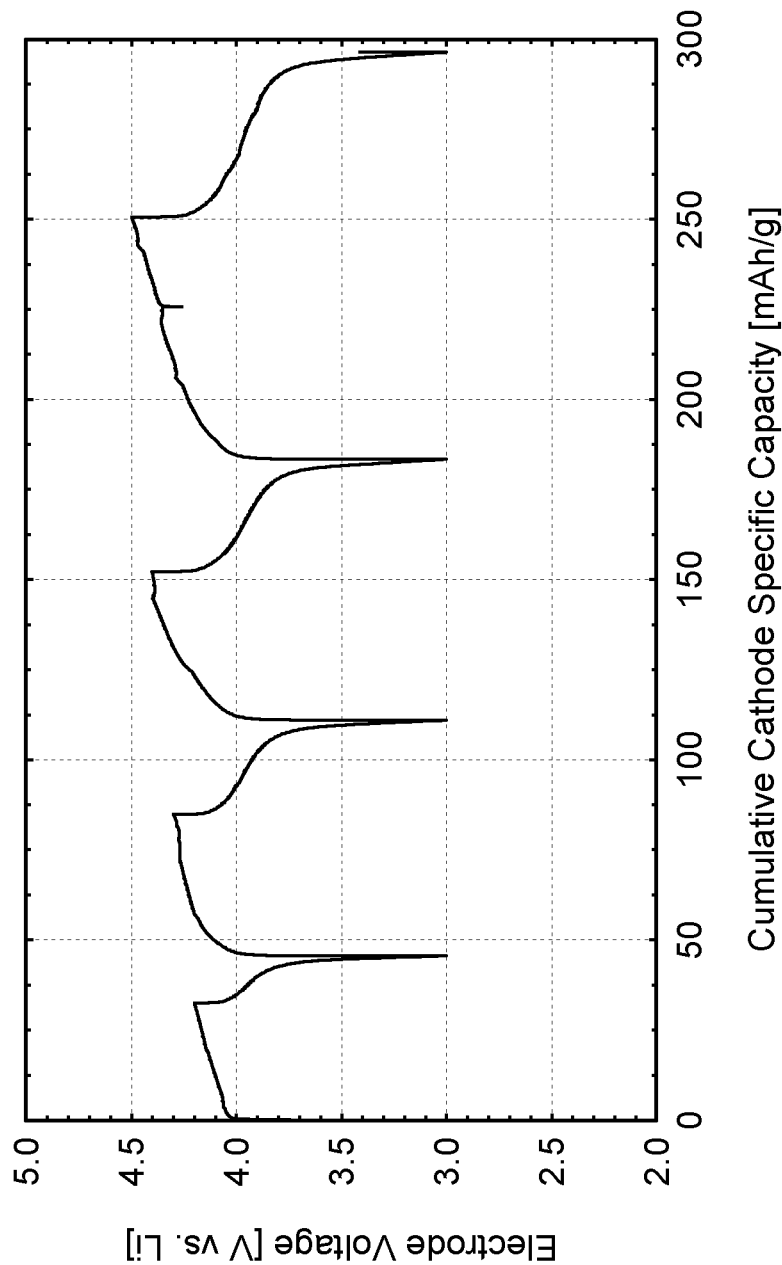
FIG. 4B shows Constant current cycling (Electrode Potential versus Cumulative Specific Capacity) of $Li_3Cu_2SbO_6$ prepared according to Example 22.

Referring to FIG. 4B. The Cell #202014 shows the constant current cycling data for the $Li_3Cu_2SbO_6$ active material (X0303) made according to Example 22. The electrolyte used a 1.0 M solution of $LiPF_6$ in ethylene carbonate (EC) and diethyl carbonate (DEC). The constant current data were collected using a lithium metal counter electrode at an approximate current density of 0.02 mA/cm$^2$ between voltage limits of 3.00 and 4.20 V. The upper voltage limit was increased by 0.1 V on subsequent cycles. The testing was carried out at room temperature. It is shown that lithium ions are extracted from the active material during the initial charging of the cell. A charge equivalent to a material specific capacity of 33 mAh/g is extracted from the active material. The re-insertion process corresponds to 14 mAh/g, indicating the reversibility of the ion extraction-insertion processes. The generally symmetrical nature of the charge-discharge curves further indicates the excellent reversibility of the system. In addition, the level of voltage hysteresis (i.e. the voltage difference between the charge and discharge processes) is extremely small, indicating the excellent kinetics of the extraction-insertion reactions. This is an important property that is useful for producing a high rate active material.

$Na_2Ni_2TeO_6$ Prepared According to Example 28.

Figure 5A:
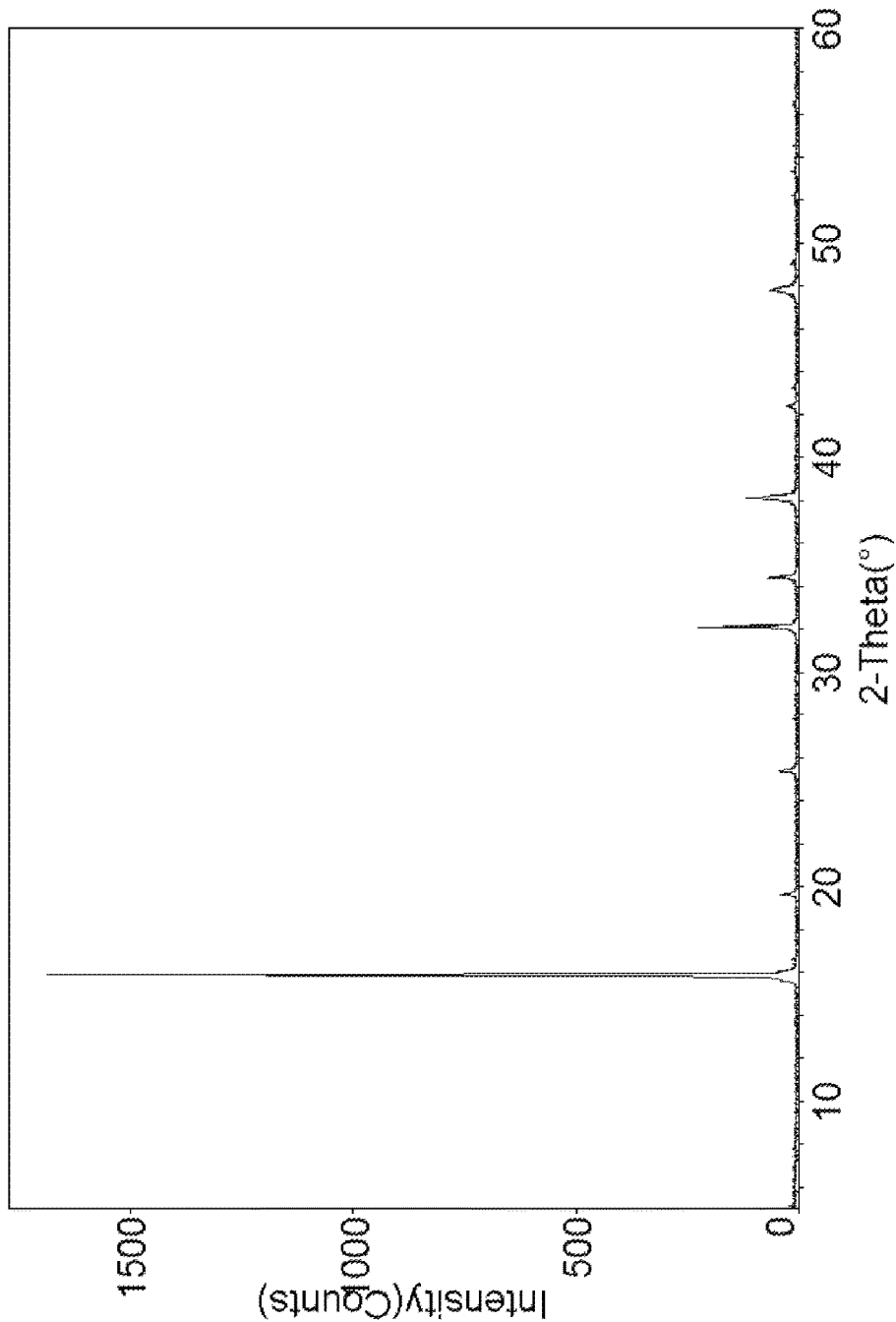
FIG. 5A is the XRD of $Na_2Ni_2TeO_6$ prepared according to Example 28.
Figure 5B:
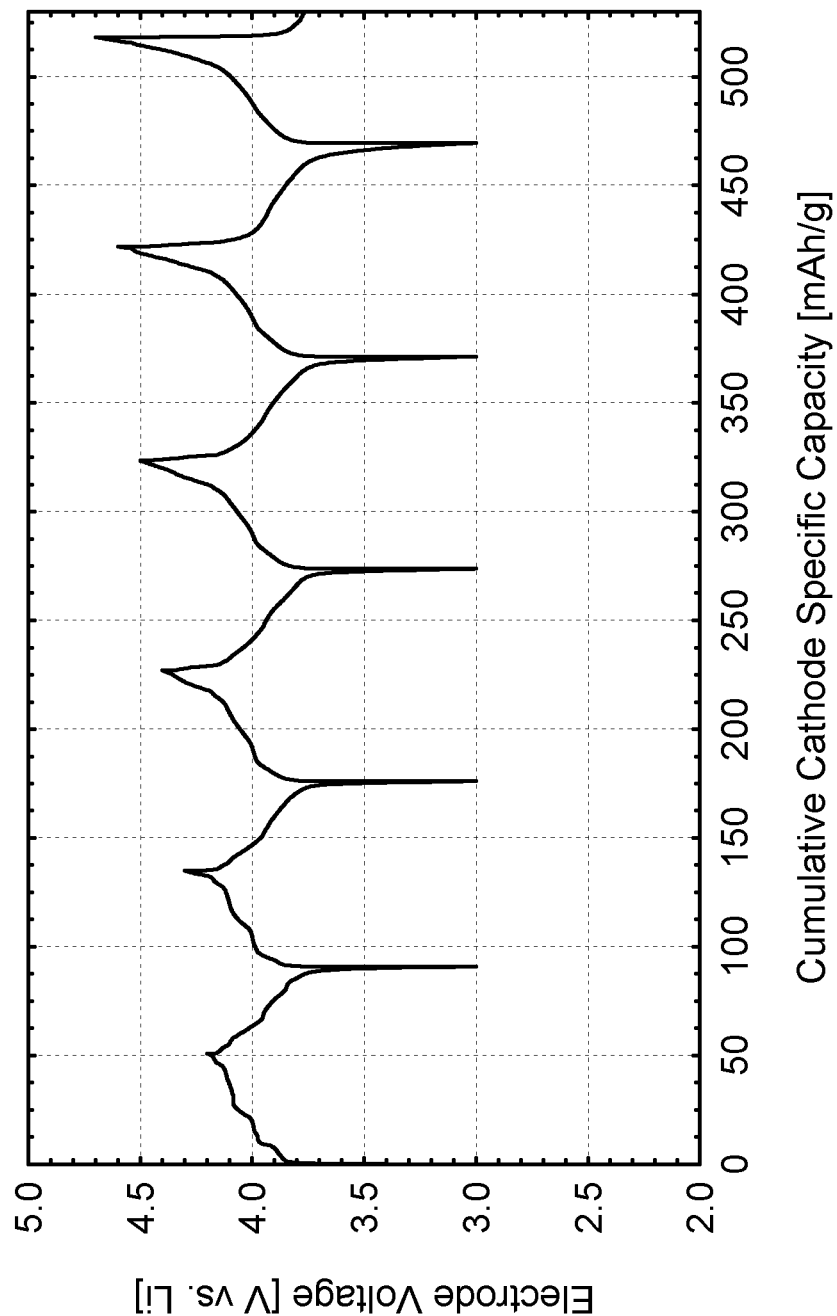
FIG. 5B shows the Constant current cycling (Electrode Potential versus Cumulative Specific Capacity) of $Na_2Ni_2TeO_6$ prepared according to Example 28.

Referring to FIG. 5B. The Cell #201017 shows the constant current cycling data for the $Na_2Ni_2TeO_6$ active material (X0217) made according to Example 28. The electrolyte used a 0.5 M solution of $NaClO_4$ in propylene carbonate. The constant current data were collected using a lithium metal counter electrode at an approximate current density of 0.02 mA/cm$^2$ between voltage limits of 3.00 and 4.20 V. The upper voltage limit was increased by 0.1 V on subsequent cycles. The testing was carried out at room temperature. It is shown that sodium ions are extracted from the active material during the initial charging of the cell. A charge equivalent to a material specific capacity of 51 mAh/g is extracted from the active material.

It is expected from thermodynamic considerations that the sodium extracted from the $Na_2Ni_2TeO_6$ active material during the initial charging process, enters the electrolyte, and would then be displacement 'plated' onto the lithium metal anode (i.e. releasing more lithium into the electrolyte). Therefore, during the subsequent discharging of the cell, it is assumed that a mix of lithium and sodium ions is re-inserted into the active material. The re-insertion process corresponds to 43 mAh/g; indicating the reversibility of the ion extraction-insertion processes. The generally symmetrical nature of the charge-discharge curves further indicates the excellent reversibility of the system. In addition, the level of voltage hysteresis (i.e. the voltage difference between the charge and discharge processes) is extremely small, indicating the excellent kinetics of the extraction-insertion reactions. This is an important property that is useful for producing a high rate active material.

$Li_3Ni_2SbO_6$ Prepared According to Example 19.

Figure 6A:
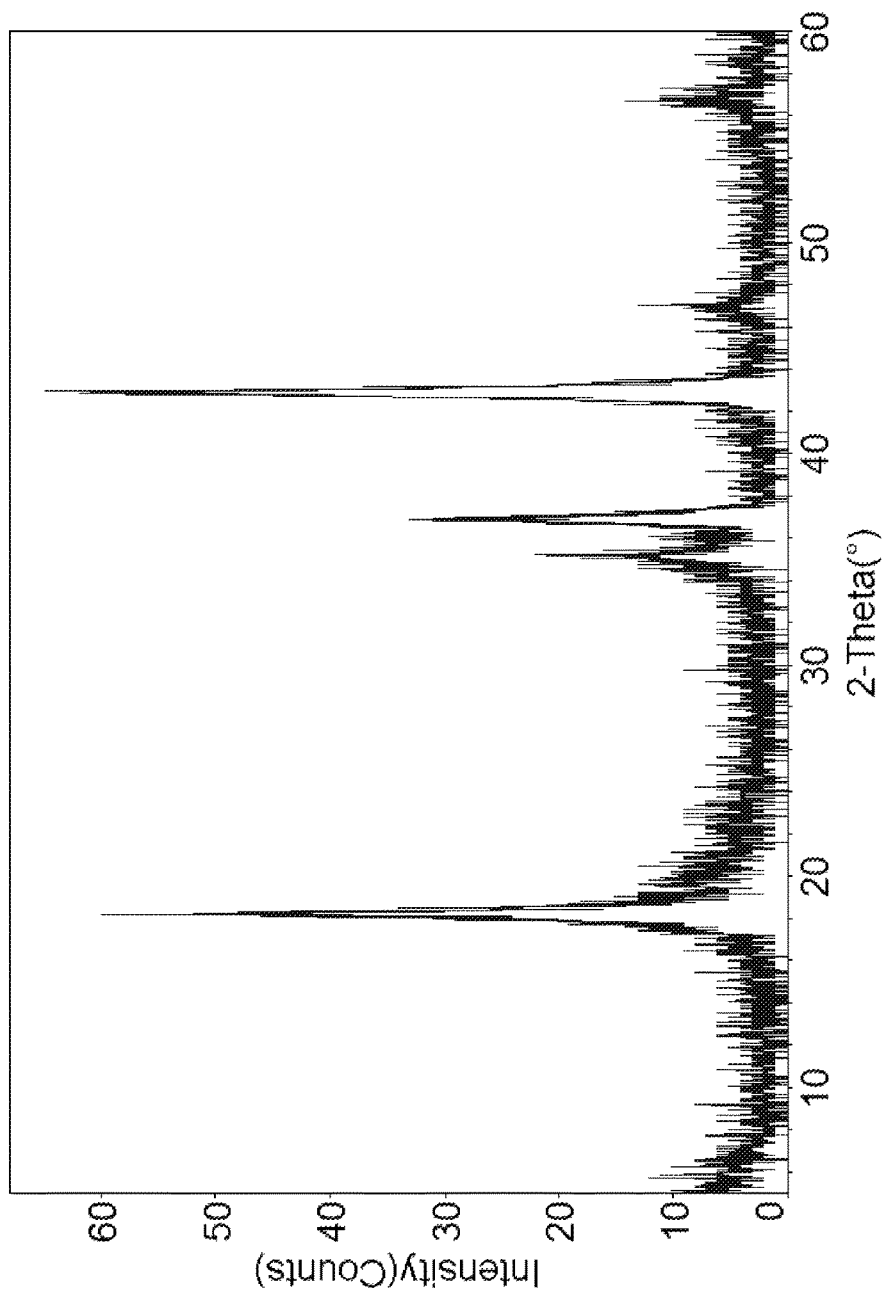
FIG. 6A is the XRD of $Li_3Ni_2SbO_6$ prepared according to Example 19.
Figure 6B:
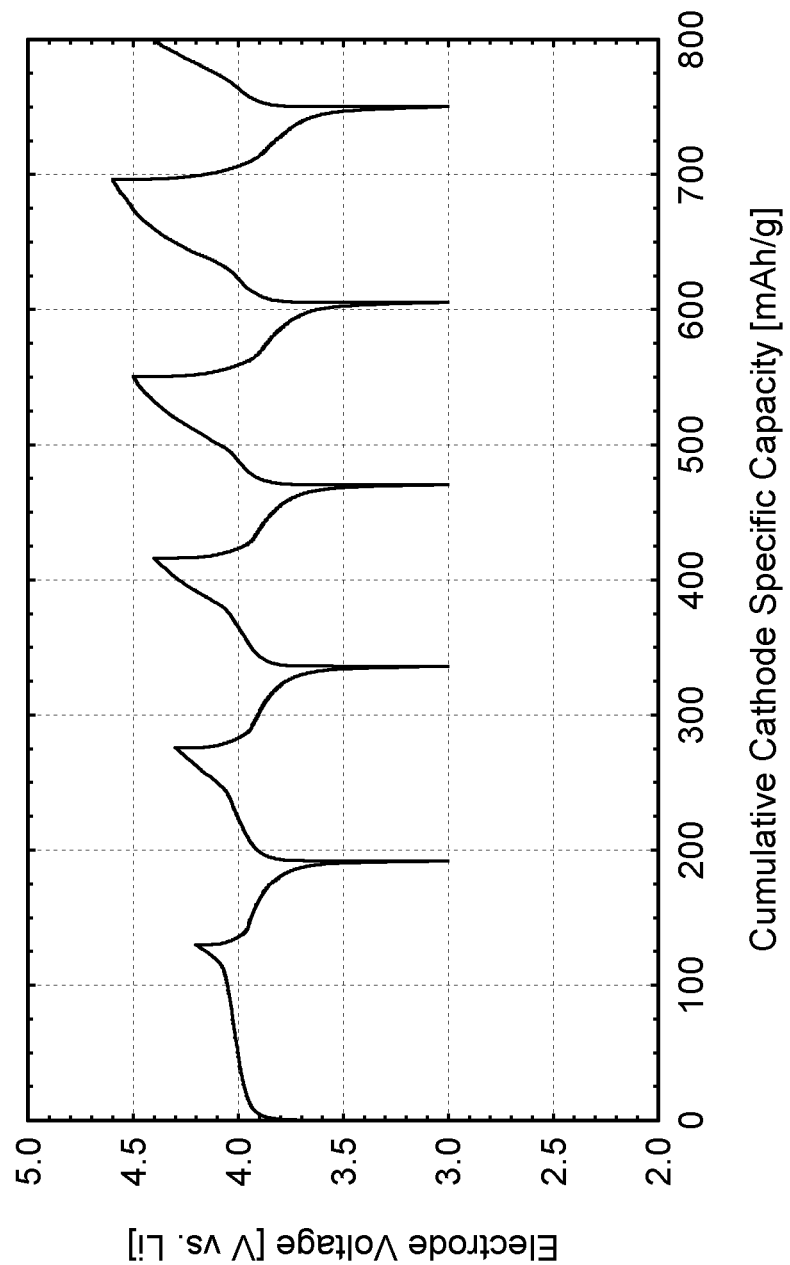
FIG. 6B shows the Constant current cycling (Electrode Potential versus Cumulative Specific Capacity) of $Li_3Ni_2SbO_6$ prepared according to Example 19.

Referring to FIG. 6B. The Cell #201020 shows the constant current cycling data for the $Li_3Ni_2SbO_6$ active material (X0223) made following Example 19. The electrolyte used a 1.0 M solution of $LiPF_6$ in ethylene carbonate (EC) and diethyl carbonate (DEC). The constant current data were collected using a lithium metal counter electrode at an approximate current density of 0.02 mA/cm$^2$, between voltage limits of 3.00 and 4.20 V. The upper voltage limit was increased by 0.1 V on subsequent cycles. The testing was carried out at room temperature. It is shown that lithium ions are extracted from the active material during the initial charging of the cell. A charge equivalent to a material specific capacity of 130 mAh/g is extracted from the active material. The re-insertion process corresponds to 63 mAh/g and indicates the reversibility of the ion extraction-insertion processes. The generally symmetrical nature of the charge-discharge curves further indicates the excellent reversibility of the system. In addition, the level of voltage hysteresis (i.e. the voltage difference between the charge and discharge processes) is extremely small, indicating the excellent kinetics of the extraction-insertion reactions. This is an important property that is useful for producing a high rate active material.

$Na_3Ni_{1.5}Mg_{0.5}SbO_6$ Prepared According to Example 34C.

Figure 7A:
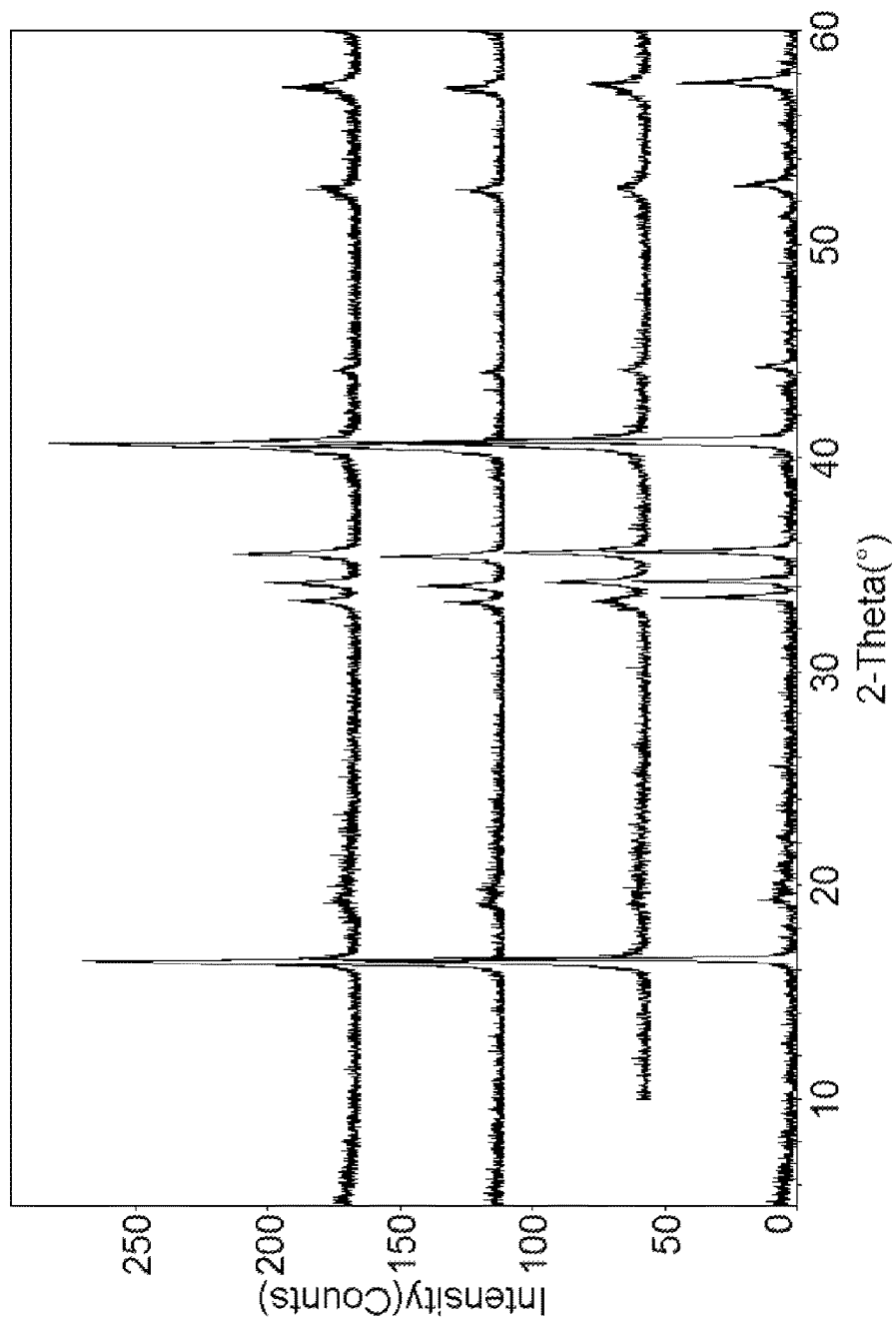
FIG. 7A is the XRD of $Na_3Ni_{2-z}Mg_zSbO_6$, where z=0.00, 0.25, 0.5, and 0.75, prepared according to method of Examples 34a, 34b, 34c, 34d respectively.
Figure 7B:
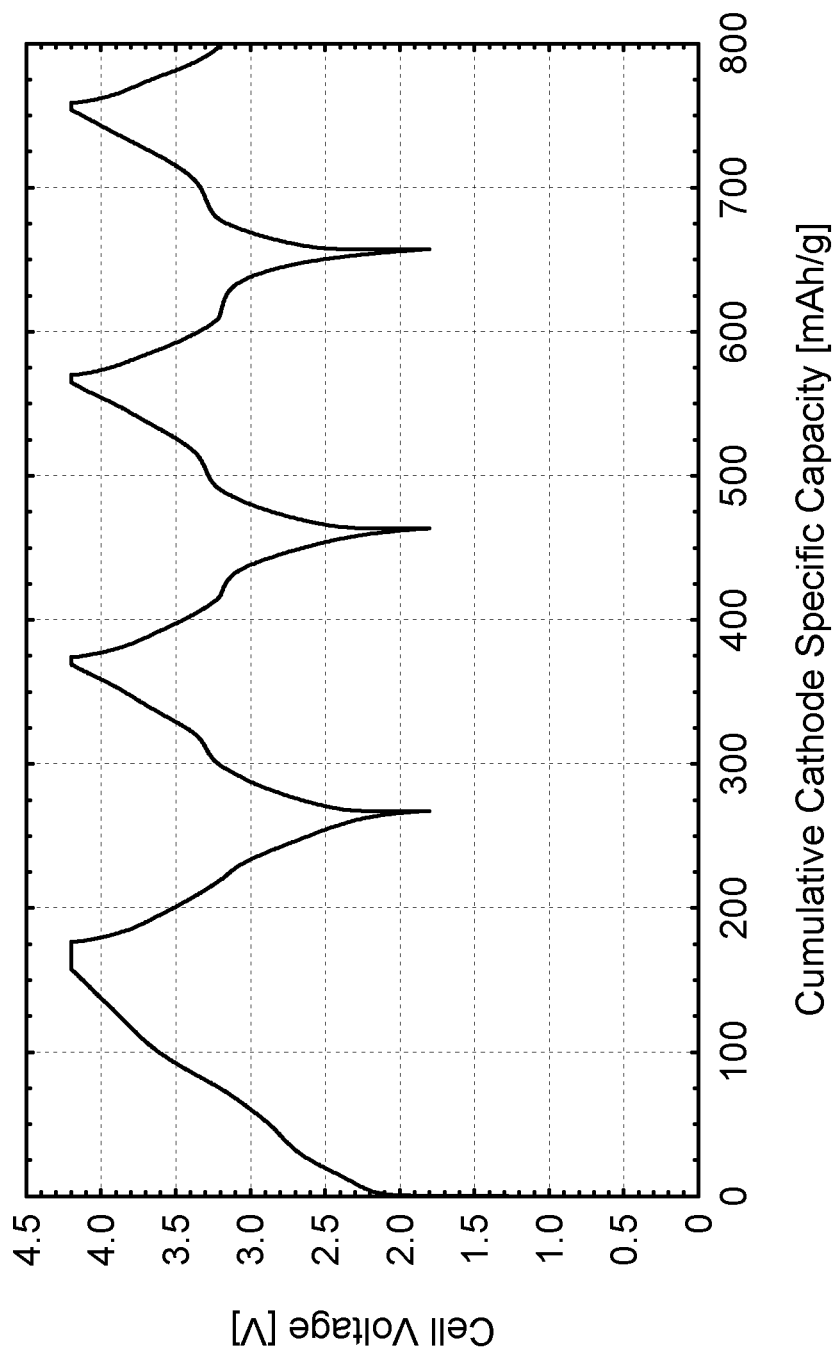
FIG. 7B shows the Constant current cycling (Cell Voltage versus Cumulative Cathode Specific Capacity) of a Na-ion cell: Hard Carbon//$Na_3Ni_{1.5}Mg_{0.5}SbO_6$ prepared according to Example 34c.

Referring to FIG. 7B. The Cell #203016 shows the constant current cycling data for the $Na_3Ni_{1.5}Mg_{0.5}SbO_6$ active material (X0336) made following Example 34c in a Na-ion cell where it is coupled with a Hard Carbon (Carbotron P/J) anode material. The electrolyte used a 0.5 M solution of $NaClO_4$ in propylene carbonate. The constant current data were collected at an approximate current density of 0.05 mA/cm$^2$ between voltage limits of 1.80 and 4.20 V.

To fully charge the cell the Na-ion cell was potentiostatically held at 4.2 V at the end of the constant current charging process. The testing was carried out at room temperature. It is shown that sodium ions are extracted from the cathode active material, $Na_3Ni_{1.6}Mg_{0.6}SbO_6$, and inserted into the Hard Carbon anode during the initial charging of the cell. During the subsequent discharge process, sodium ions are extracted from the Hard Carbon and re-inserted into the $Na_3Ni_{1.6}Mg_{0.5}SbO_6$ cathode active material. The first discharge process corresponds to a specific capacity for the cathode of 91 mAh/g, indicating the reversibility of the sodium ion extraction-insertion processes. The generally symmetrical nature of the charge-discharge curves further indicates the excellent reversibility of the system. In addition, the level of voltage hysteresis (i.e. the voltage difference between the charge and discharge processes) is extremely small, indicating the excellent kinetics of the extraction-insertion reactions. This is an important property that is useful for producing a high rate active material.

$Li_3Ni_{1.5}Mg_{0.5}SbO_6$ Prepared According to Example 17.

Figure 8A:
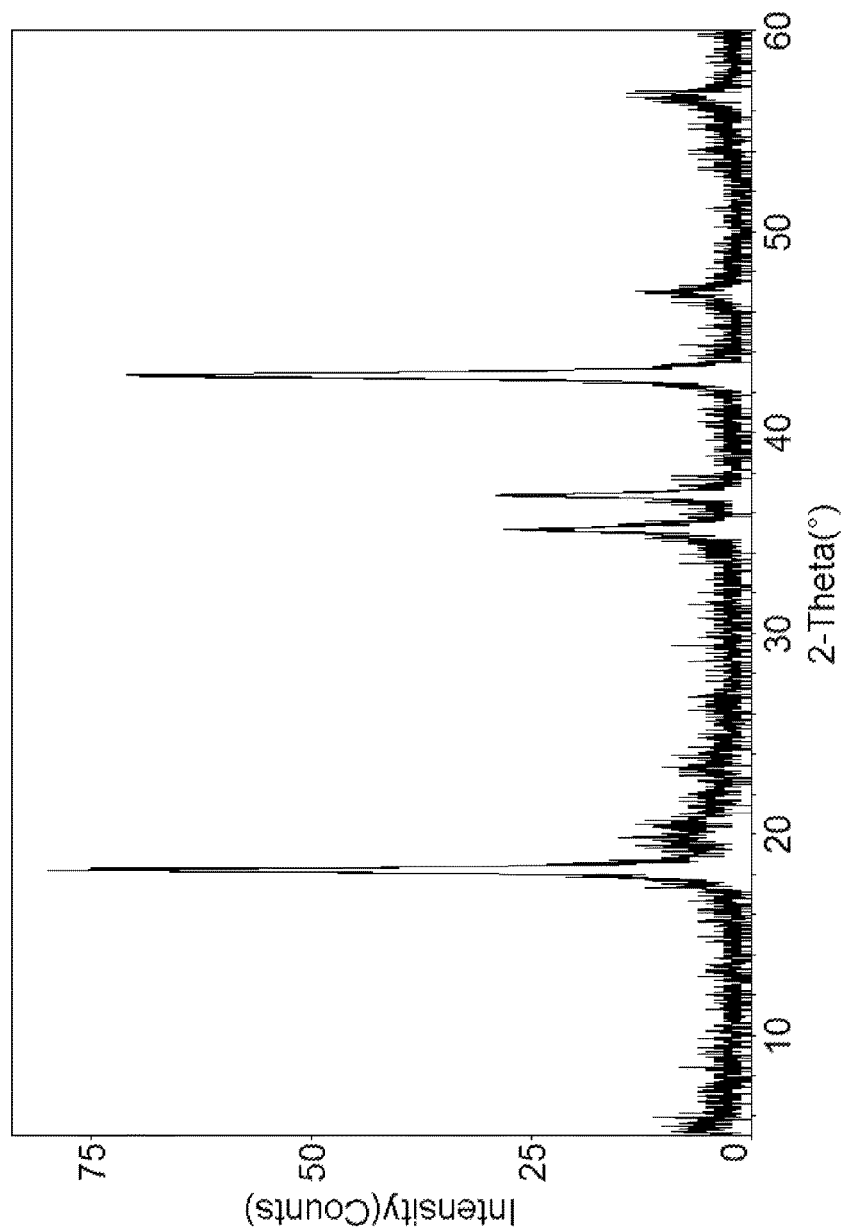
FIG. 8A is the XRD of $Li_3Ni_{1.5}Mg_{0.5}SbO_6$ prepared according to Example 17.
Figure 8B:
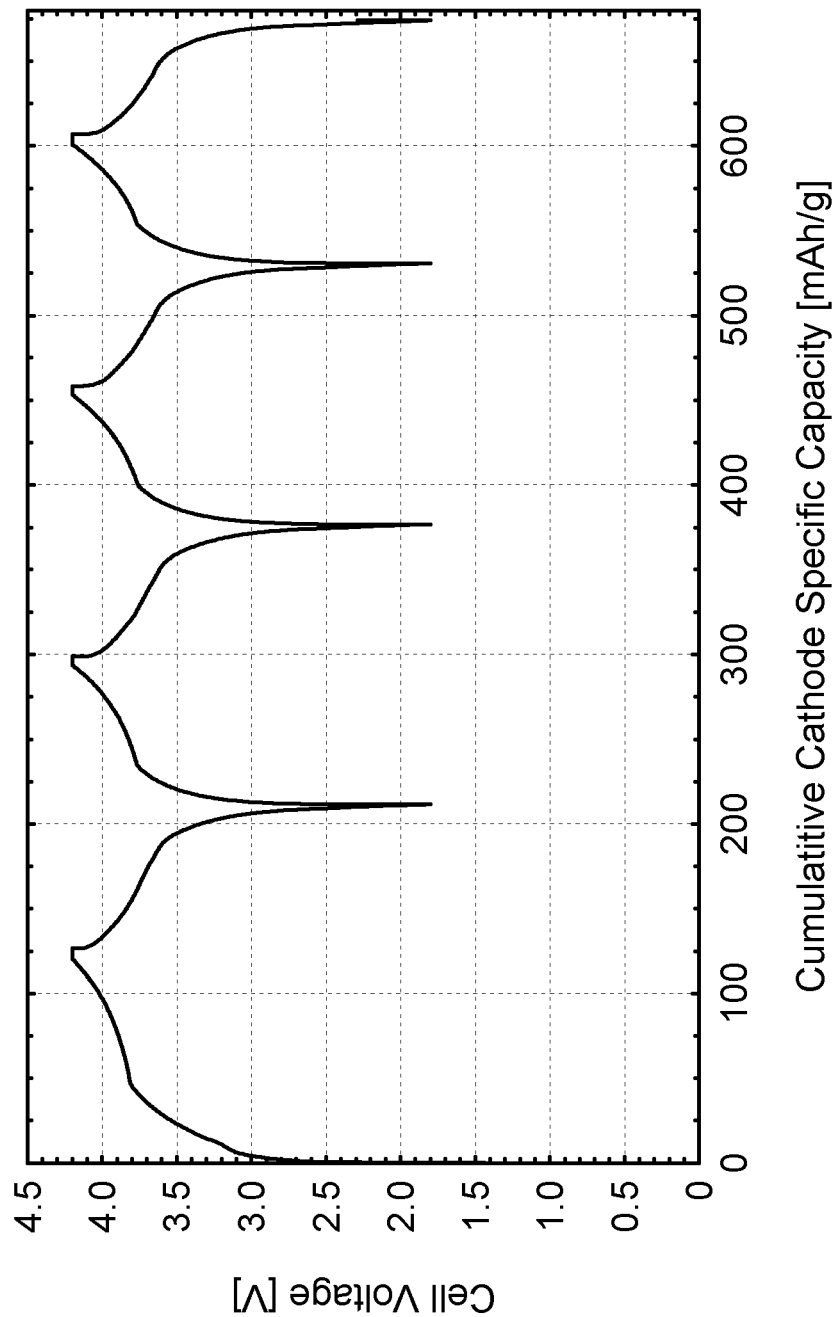
FIG. 8B shows the Constant current cycling (Cell Voltage versus Cumulative Cathode Specific Capacity) of a Li-ion cell: Graphite//$Li_3Ni_{1.5}Mg_{0.5}SbO_6$ prepared according to Example 17.

Referring to FIG. 8B. The Cell #203018 shows the constant current cycling data for the $Li_3Ni_{1.6}Mg_{0.5}SbO_6$ active material (X0368) made according to Example 17 in a Li-ion cell where it is coupled with a Crystalline Graphite (Conoco Inc.) anode material. The electrolyte used a 1.0 M solution of $LiPF_6$ in ethylene carbonate (EC) and diethyl carbonate (DEC). The constant current data were collected at an approximate current density of 0.05 mA/cm$^2$ between voltage limits of 1.80 and 4.20 V. To fully charge the cell the Li-ion cell was potentiostatically held at 4.2 V at the end of the constant current charging process. The testing was carried out at room temperature. It is shown that lithium ions are extracted from the cathode active material, $Li_3Ni_{1.6}Mg_{0.6}SbO_6$, and inserted into the Graphite anode during the initial charging of the cell. During the subsequent discharge process, lithium ions are extracted from the Graphite and re-inserted into the $Li_3Ni_{1.6}Mg_{0.6}SbO_6$ cathode active material. The first discharge process corresponds to a specific capacity for the cathode of 85 mAh/g, indicating the reversibility of the lithium ion extraction-insertion processes. The generally symmetrical nature of the charge-discharge curves further indicates the excellent reversibility of the system. In addition, the level of voltage hysteresis (i.e. the voltage difference between the charge and discharge processes) is extremely small, indicating the excellent kinetics of the extraction-insertion reactions. This is an important property that is useful for producing a high rate active material.

$Na_3Ni_{1.76}Zn_{0.26}SbO_6$ Prepared According to Example 35.

Figure 9A:
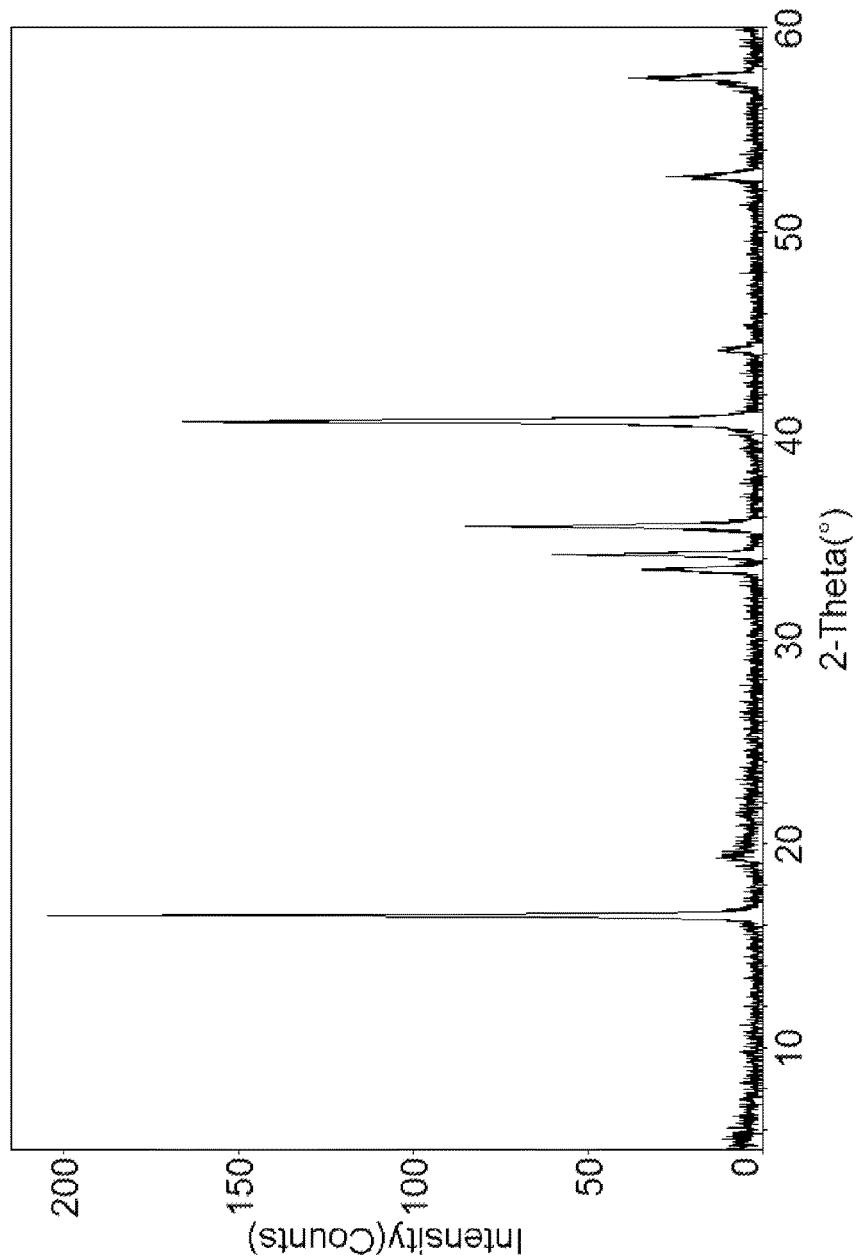
FIG. 9A is the XRD of $Na_3Ni_{1.75}Zn_{0.25}SbO_6$ prepared according to Example 35.
Figure 9B:
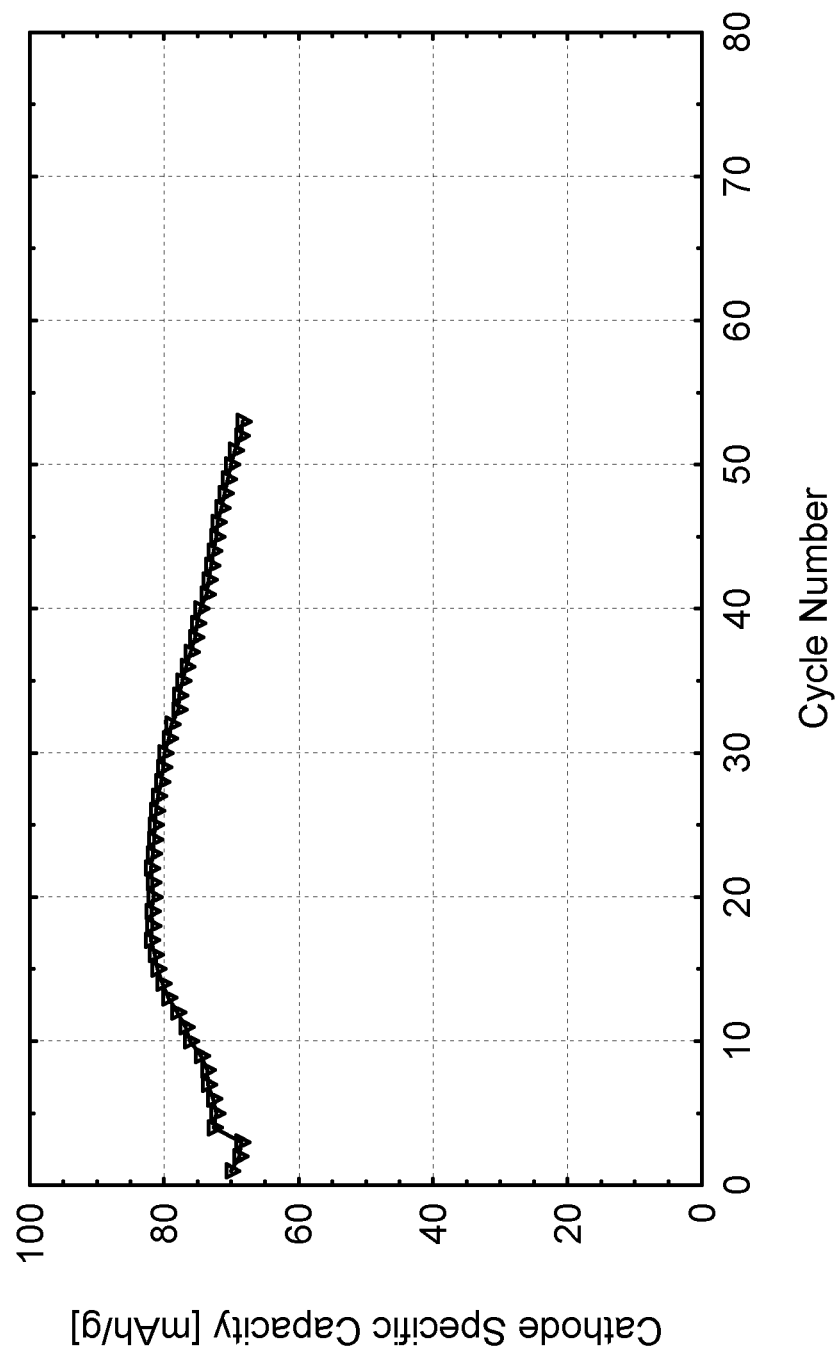
FIG. 9B shows the long term Constant current cycling performance (cathode specific capacity versus cycle number) of a Na-ion Cell comprising Carbotron (Kureha Inc.) Hard Carbon//$Na_3Ni_{1.75}Zn_{0.25}SbO_6$ prepared according to Example 35.

FIG. 9B (Cell#203054) shows the long term constant current cycling performance (cathode specific capacity versus cycle number) of a Na-ion Cell comprising Carbotron (Kureha Inc.) Hard Carbon//$Na_3Ni_{1.75}Zn_{0.25}SbO_6$ (Material=X0392) using a 0.5 M $NaClO_4$-propylene carbonate (PC) electrolyte. The constant current cycling test was carried out at 25° C. between voltage limits of 1.8 and 4.2 V. To fully charge the cell, the Na-ion cell was held at a cell voltage of 4.2 V at the end of the constant current charging process until the cell current had decayed to one tenth of the constant current value. During the charging of the cell, sodium ions are extracted from the cathode active material, and inserted into the Hard Carbon anode. During the subsequent discharge process, sodium ions are extracted from the Hard Carbon and re-inserted into the cathode active material. The initial cathode specific capacity (cycle 1) is 70 mAh/g. The Na-ion cell cycles more than 50 times with low capacity fade.

$Na_3Ni_{1.75}Cu_{0.25}SbO_6$ Prepared According to Example 36.

Figure 10A:
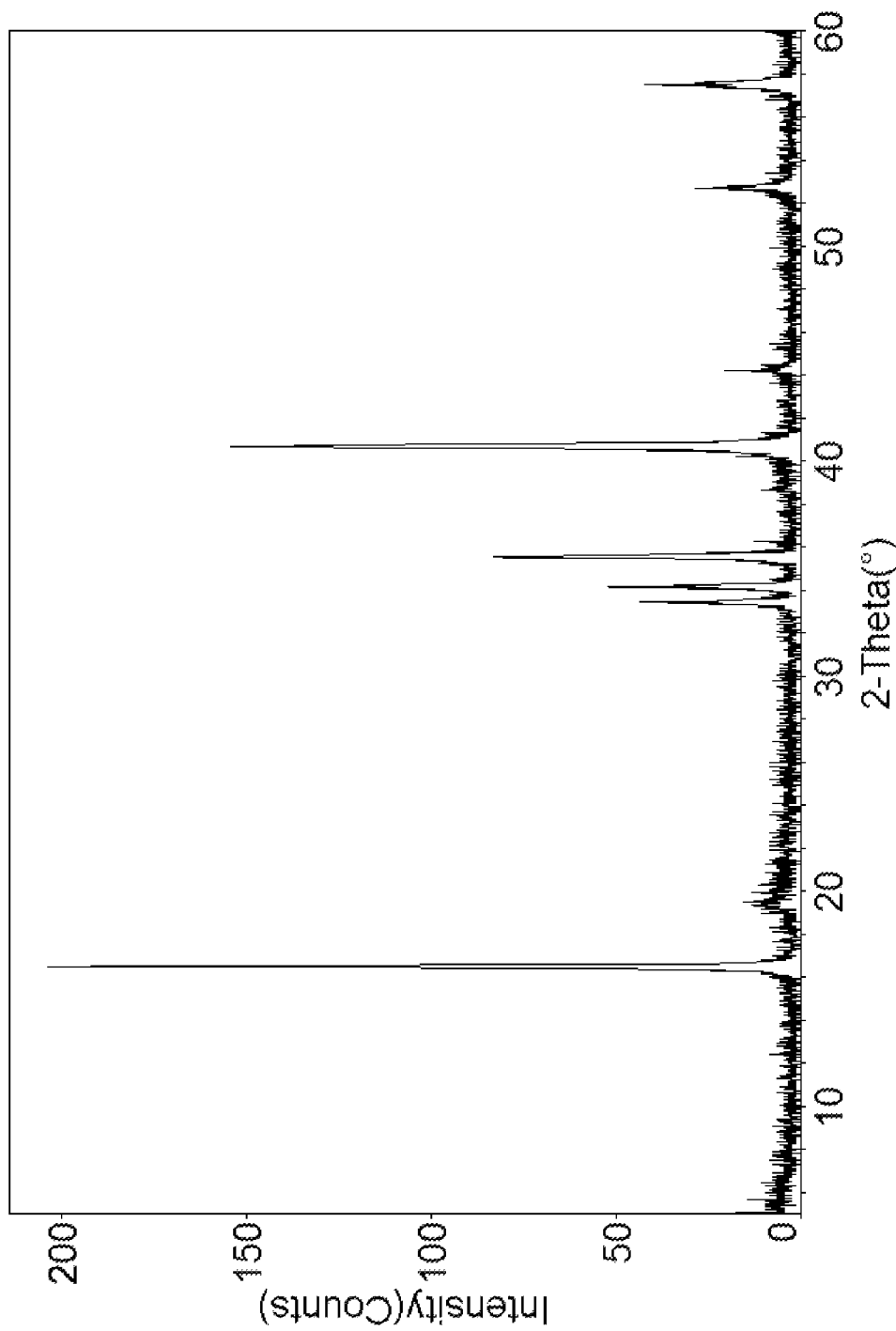
FIG. 10A is the XRD of $Na_3Ni_{1.75}Cu_{0.25}SbO_6$ prepared according to Example 36.
Figure 10B:
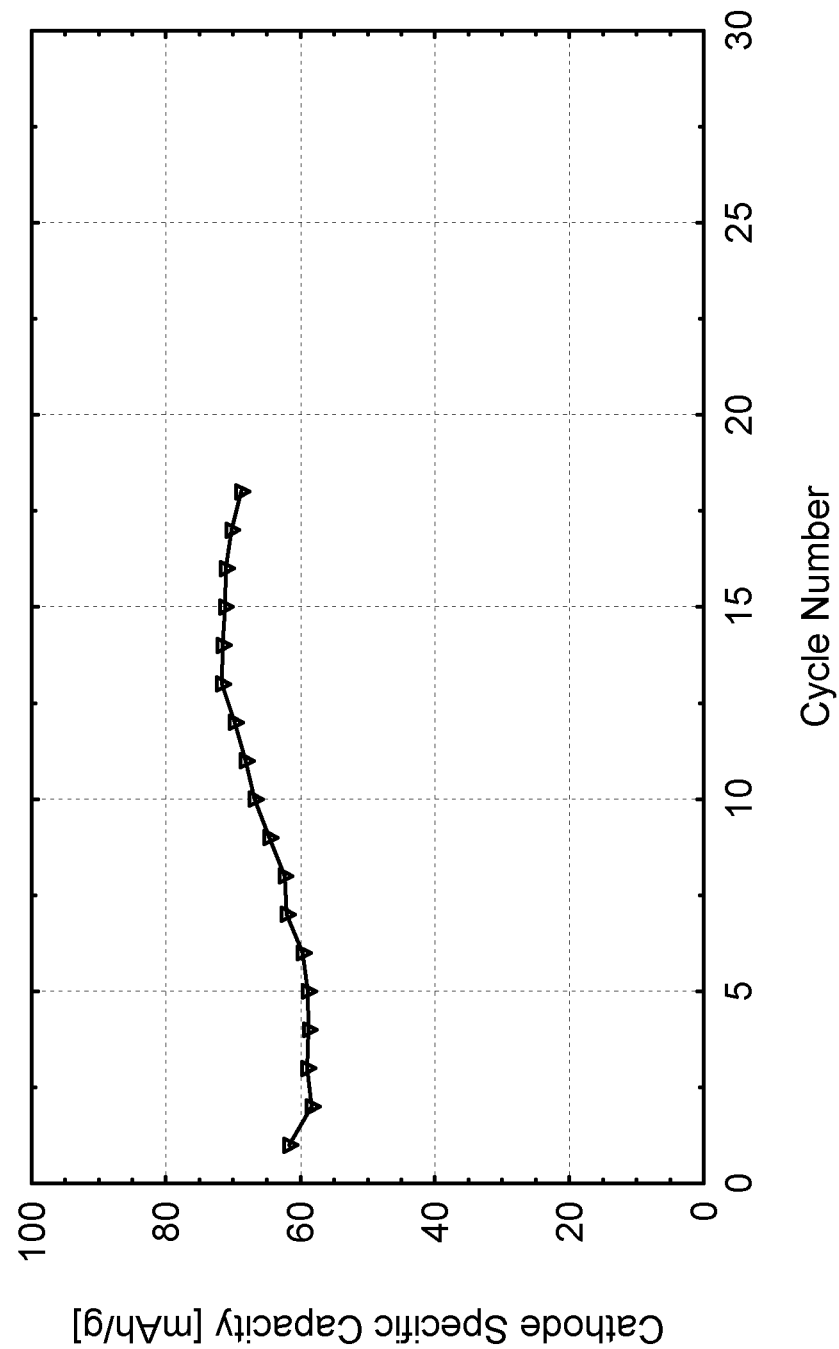
FIG. 10B shows the long term constant current cycling performance (cathode specific capacity versus cycle number) of a Na-ion Cell comprising: Hard Carbon//$Na_3Ni_{1.75}Cu_{0.25}SbO_6$ prepared according to Example 36.

FIG. 10B (Cell#203055) shows the long term constant current cycling performance (cathode specific capacity versus cycle number) of a Na-ion Cell comprising: Hard Carbon//$Na_3Ni_{1.75}Cu_{0.25}SbO_6$ (Material=X0393) using a 0.5 M $NaClO_4$-propylene carbonate (PC) electrolyte. The constant current cycling test was carried out at 25° C. between voltage limits of 1.8 and 4.2 V. To fully charge the cell, the Na-ion cell was held at a cell voltage of 4.2 V at the end of the constant current charging process until the cell current had decayed to one tenth of the constant current value. During the charging of the cell, sodium ions are extracted from the cathode active material, and inserted into the Hard Carbon anode. During the subsequent discharge process, sodium ions are extracted from the Hard Carbon and re-inserted into the cathode active material. The initial cathode specific capacity (cycle 1) is 62 mAh/g. The Na-ion cell cycles 18 times with low capacity fade.

$Na_3Ni_{1.25}Mg_{0.75}SbO_6$ Prepared According to Example 34d.

Figure 11A:
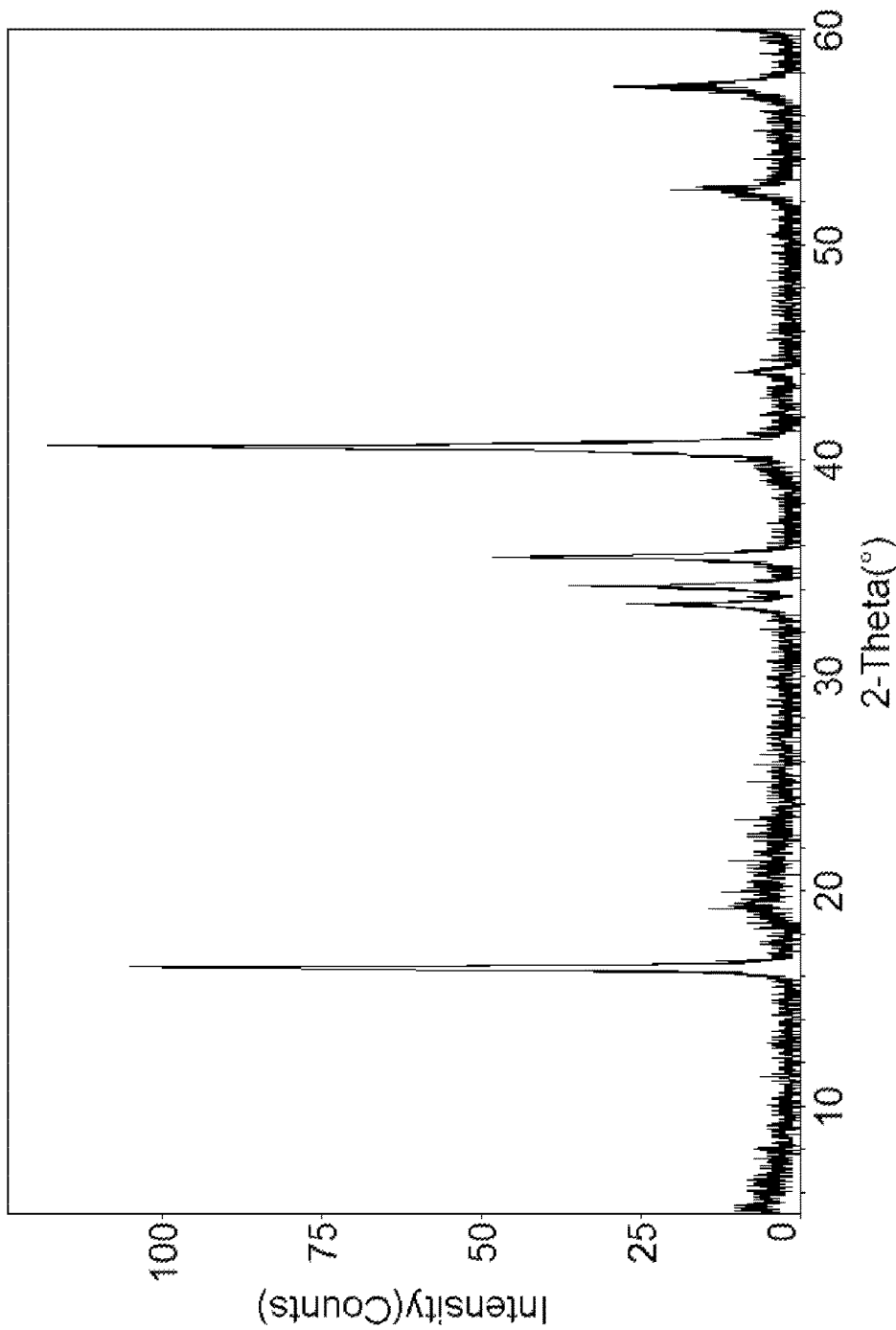
FIG. 11A is the XRD of $Na_3Ni_{1.25}Mg_{0.75}SbO_6$ prepared according to Example 34d.
Figure 11B:
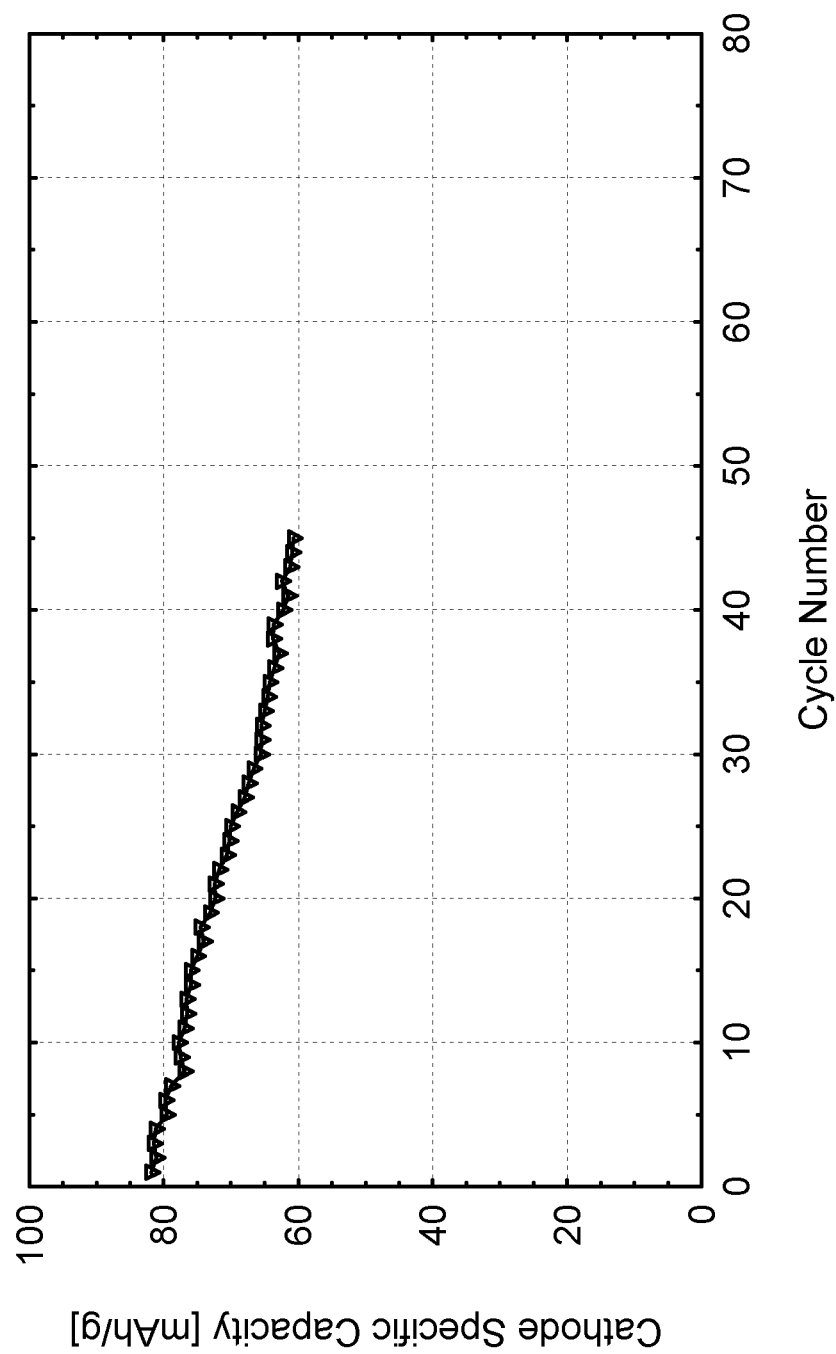
FIG. 11B shows the long term constant current cycling performance (cathode specific capacity versus cycle number) of a Na-ion Cell comprising: Hard Carbon//$Na_3Ni_{1.25}Mg_{0.75}SbO_6$ prepared according to Example 34d.

FIG. 11B (Cell#203047) shows the long term constant current cycling performance (cathode specific capacity versus cycle number) of a Na-ion Cell comprising: Hard Carbon//$Na_3Ni_{1.25}Mg_{0.75}SbO_6$ (Material=X0373) using a 0.5 M $NaClO_4$-propylene carbonate (PC) electrolyte. The constant current cycling test was carried out at 25° C. between voltage limits of 1.8 and 4.0 V. To fully charge the cell, the Na-ion cell was held at a cell voltage of 4.0 V at the end of the constant current charging process until the cell current had decayed to one tenth of the constant current value. During the charging of the cell, sodium ions are extracted from the cathode active material, and inserted into the Hard Carbon anode.

During the subsequent discharge process, sodium ions are extracted from the Hard Carbon and re-inserted into the cathode active material. The initial cathode specific capacity (cycle 1) is 83 mAh/g. The Na-ion cell cycles more than 40 times with low capacity fade.

$Na_3Ni_{1.50}Mn_{0.50}SbO_6$ Prepared According to Example 37.

Figure 12A:
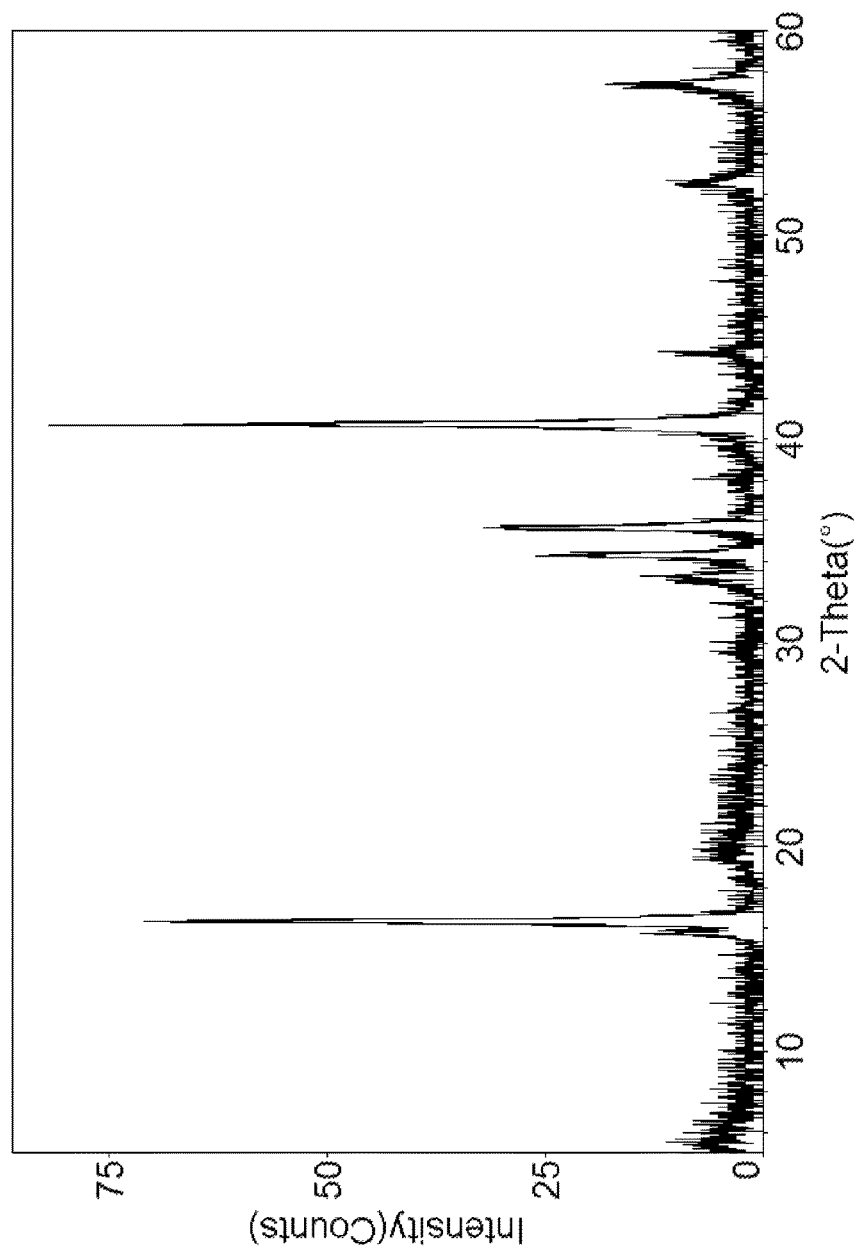
FIG. 12A is the XRD of $Na_3Ni_{1.50}Mn_{0.50}SbO_6$ prepared according to Example 37.
Figure 12B:
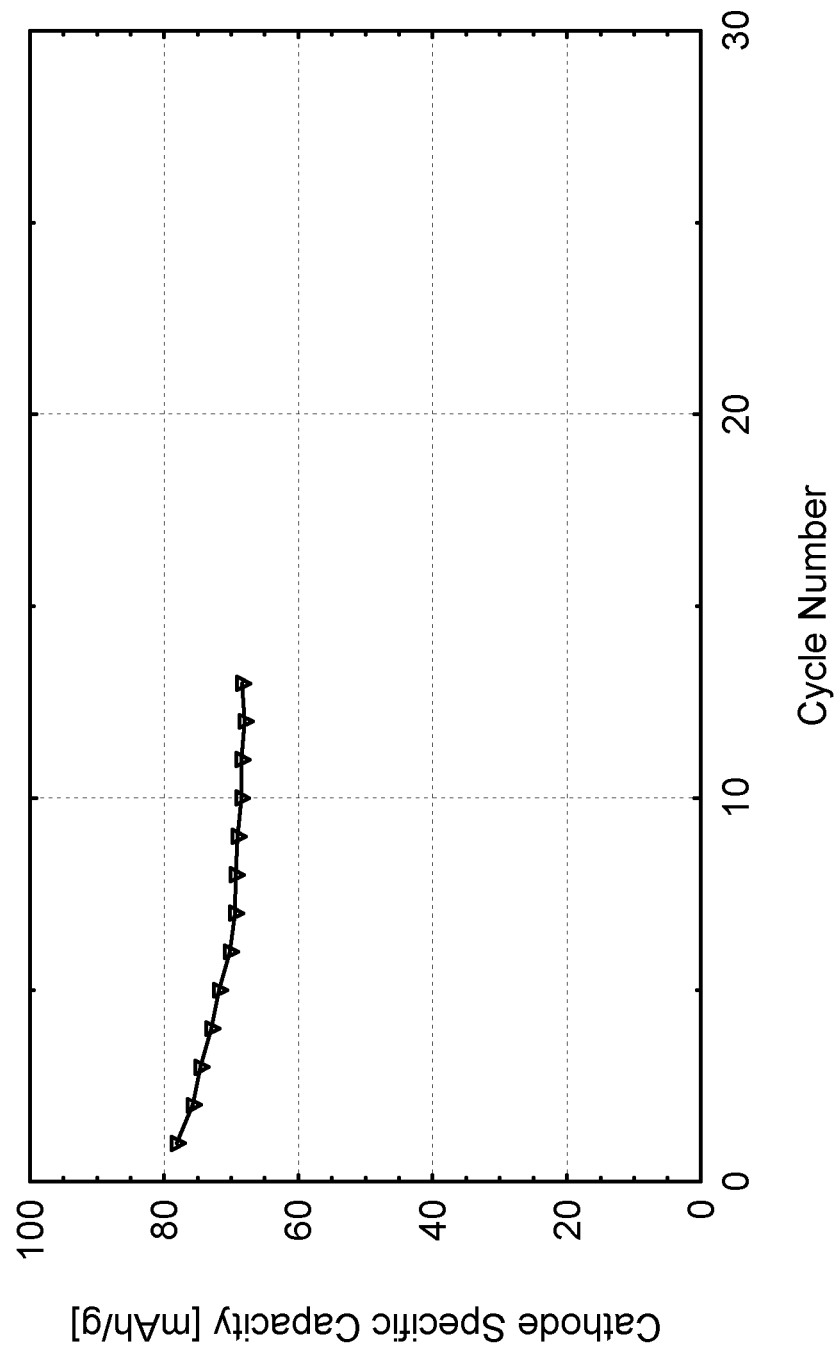
FIG. 12B shows the long term constant current cycling performance (cathode specific capacity versus cycle number) of a Na-ion Cell comprising: Hard Carbon//$Na_3Ni_{1.50}Mn_{0.50}SbO_6$ prepared according to Example 37.

FIG. 12B (Cell#203029) shows the long term constant current cycling performance (cathode specific capacity versus cycle number) of a Na-ion Cell comprising: Hard Carbon//$Na_3Ni_{1.50}Mn_{0.50}SbO_6$ (Material=X0380) using a 0.5 M $NaClO_4$-propylene carbonate (PC) electrolyte. The constant current cycling test was carried out at 25° C. between voltage limits of 1.8 and 4.2 V. To fully charge the cell, the Na-ion cell was held at a cell voltage of 4.2 V at the end of the constant current charging process until the cell current had decayed to one tenth of the constant current value. During the charging of the cell, sodium ions are extracted from the cathode active material, and inserted into the Hard Carbon anode. During the subsequent discharge process, sodium ions are extracted from the Hard Carbon and re-inserted into the cathode active material. The initial cathode specific capacity (cycle 1) is 78 mAh/g. The Na-ion cell cycles 13 times with low capacity fade.

$Li_4FeSbO_6$ Prepared According to Example 38.

Figure 13A:
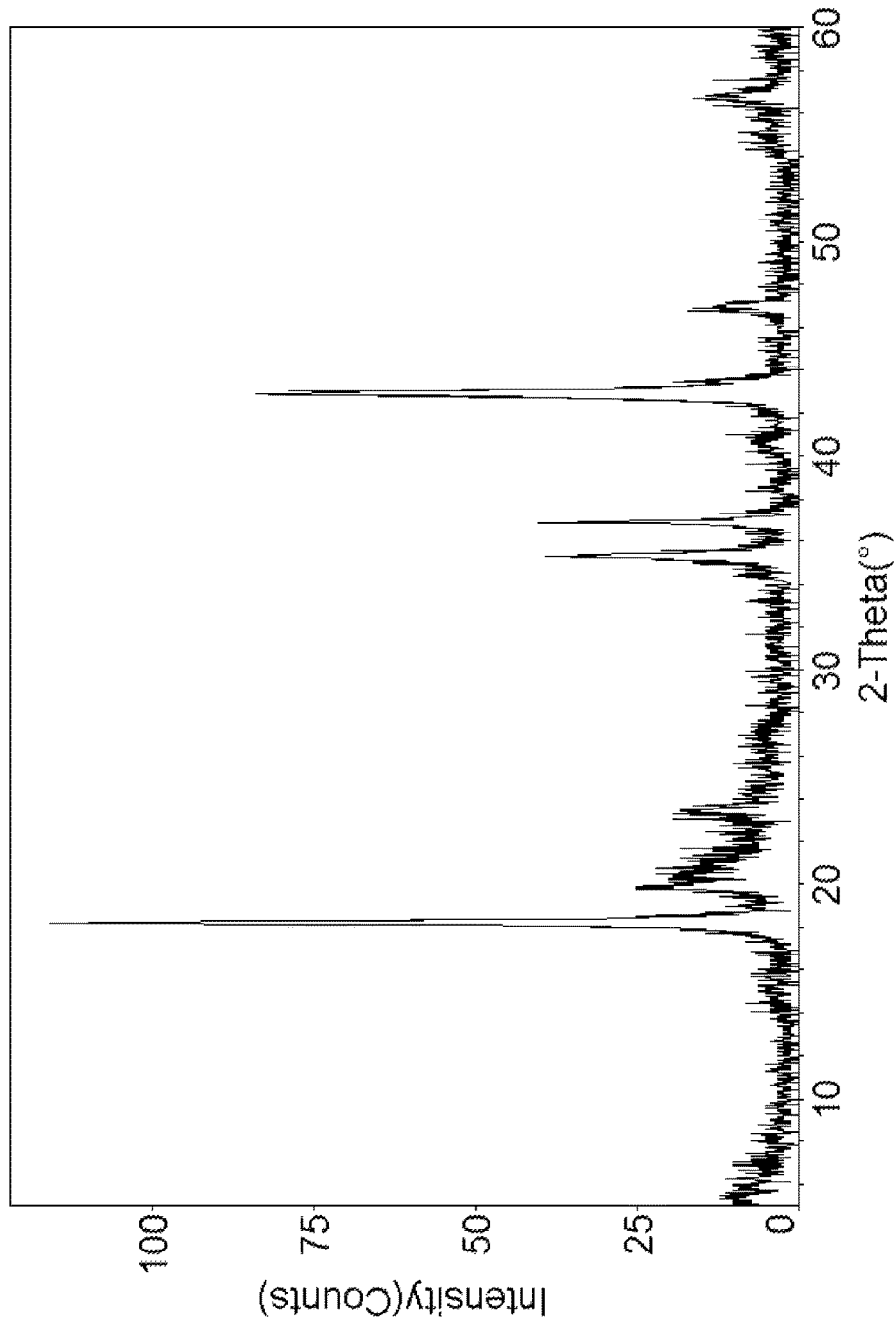
FIG. 13A is the XRD of $Li_4FeSbO_6$ prepared according to Example 38.
Figure 13B:
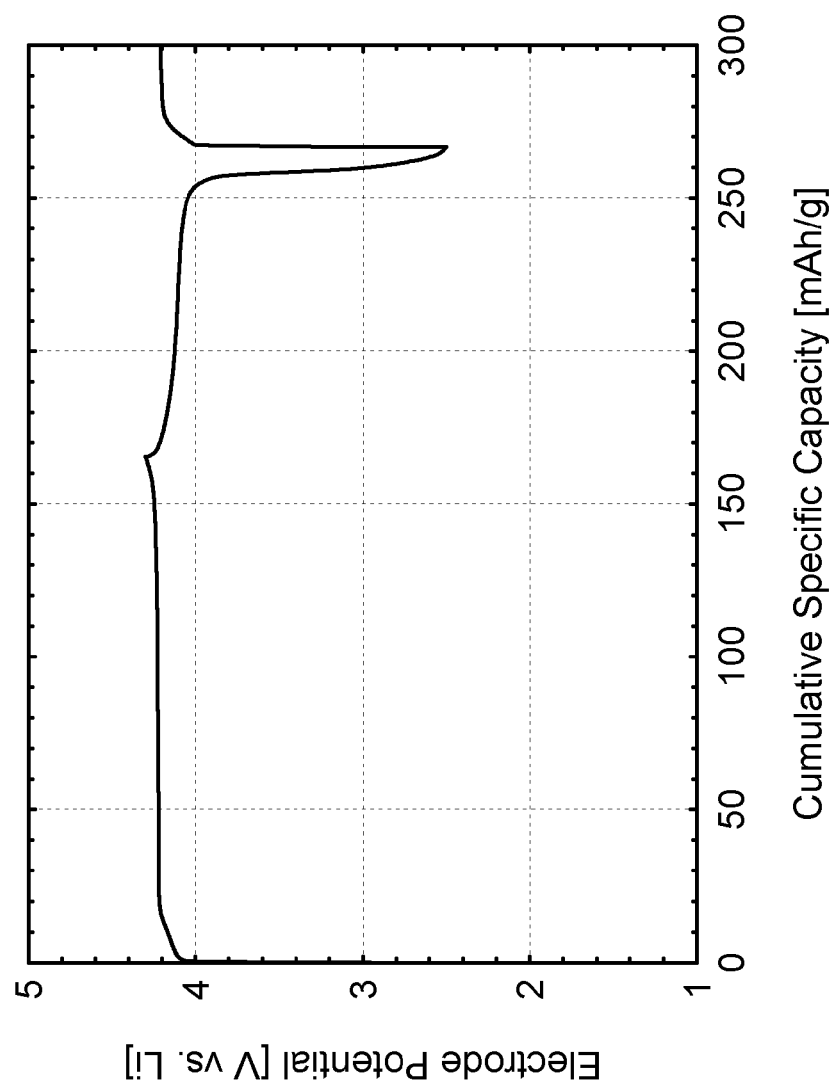
FIG. 13B shows the constant current cycling data for the $Li_4FeSbO_6$ active material prepared according to Example 38.

FIG. 13B (Cell #303017) shows the constant current cycling data for the $Li_4FeSbO_6$ active material (X1120A). The electrolyte used a 1.0 M solution of $LiPF_6$ in ethylene carbonate (EC) and diethyl carbonate (DEC). The constant current data were collected using a lithium metal counter electrode at an approximate current density of 0.04 mA/$cm^2$ between voltage limits of 2.50 and 4.30 V. The testing was carried out at 25° C. It is shown that lithium ions are extracted from the active material during the initial charging of the cell. A charge equivalent to a material specific capacity of 165 mAh/g is extracted from the active material. The re-insertion process corresponds to 100 mAh/g, indicating the reversibility of the ion extraction-insertion processes. The generally symmetrical nature of the charge-discharge curves further indicates the excellent reversibility of the system.

$Li_4NiTeO_6$ Prepared According to Example 39

Figure 14A:
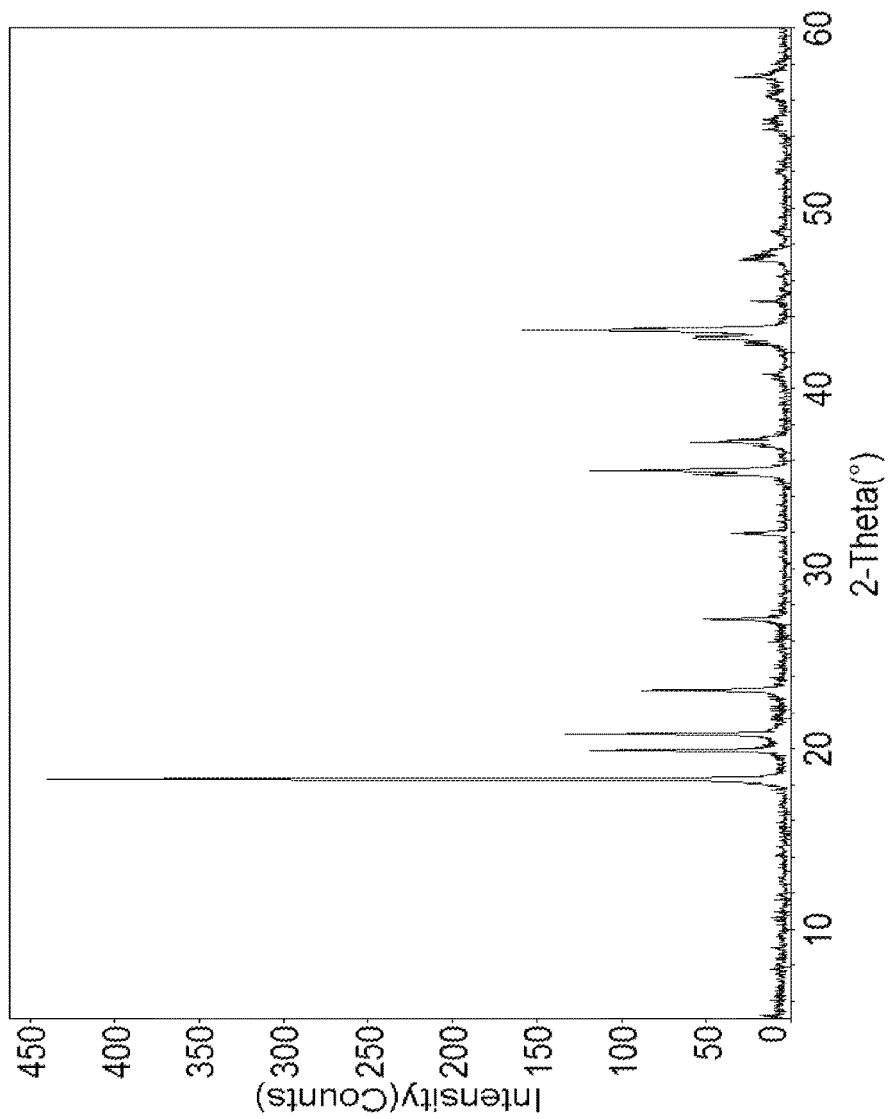
FIG. 14A is the XRD of $Li_4NiTeO_6$ prepared according to Example 39.
Figure 14B:
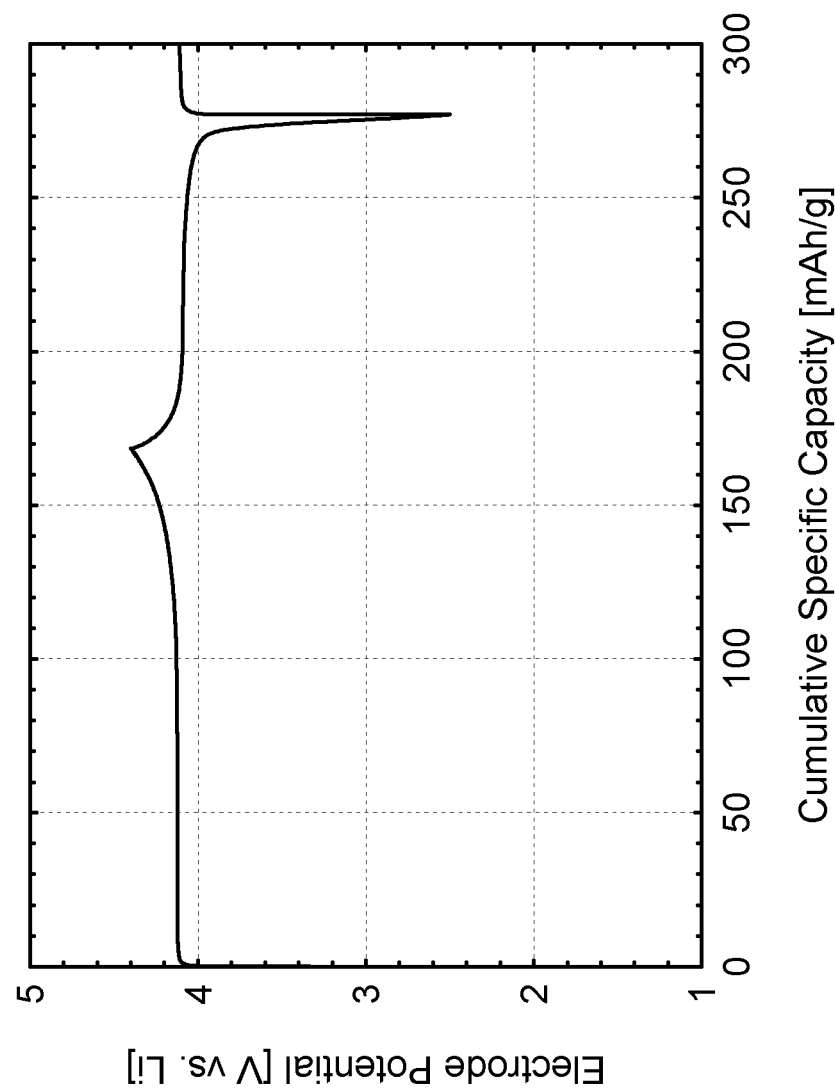
FIG. 14B shows the constant current cycling data for the $Li_4NiTeO_6$ active material prepared according to Example 39.

FIG. 14B (Cell #303018) shows the constant current cycling data for the $Li_4NiTeO_6$ active material (X1121). The electrolyte used a 1.0 M solution of $LiPF_6$ in ethylene carbonate (EC) and diethyl carbonate (DEC). The constant current data were collected using a lithium metal counter electrode at an approximate current density of 0.04 mA/$cm^2$ between voltage limits of 2.50 and 4.40 V. The testing was carried out at 25° C. It is shown that lithium ions are extracted from the active material during the initial charging of the cell. A charge equivalent to a material specific capacity of 168 mAh/g is extracted from the active material. The re-insertion process corresponds to 110 mAh/g, indicating the reversibility of the alkali ion extraction-insertion processes. The generally symmetrical nature of the charge-discharge curves further indicates the excellent reversibility of the system.

$Na_4NiTeO_6$ Prepared According to Example 40.

Figure 15A:
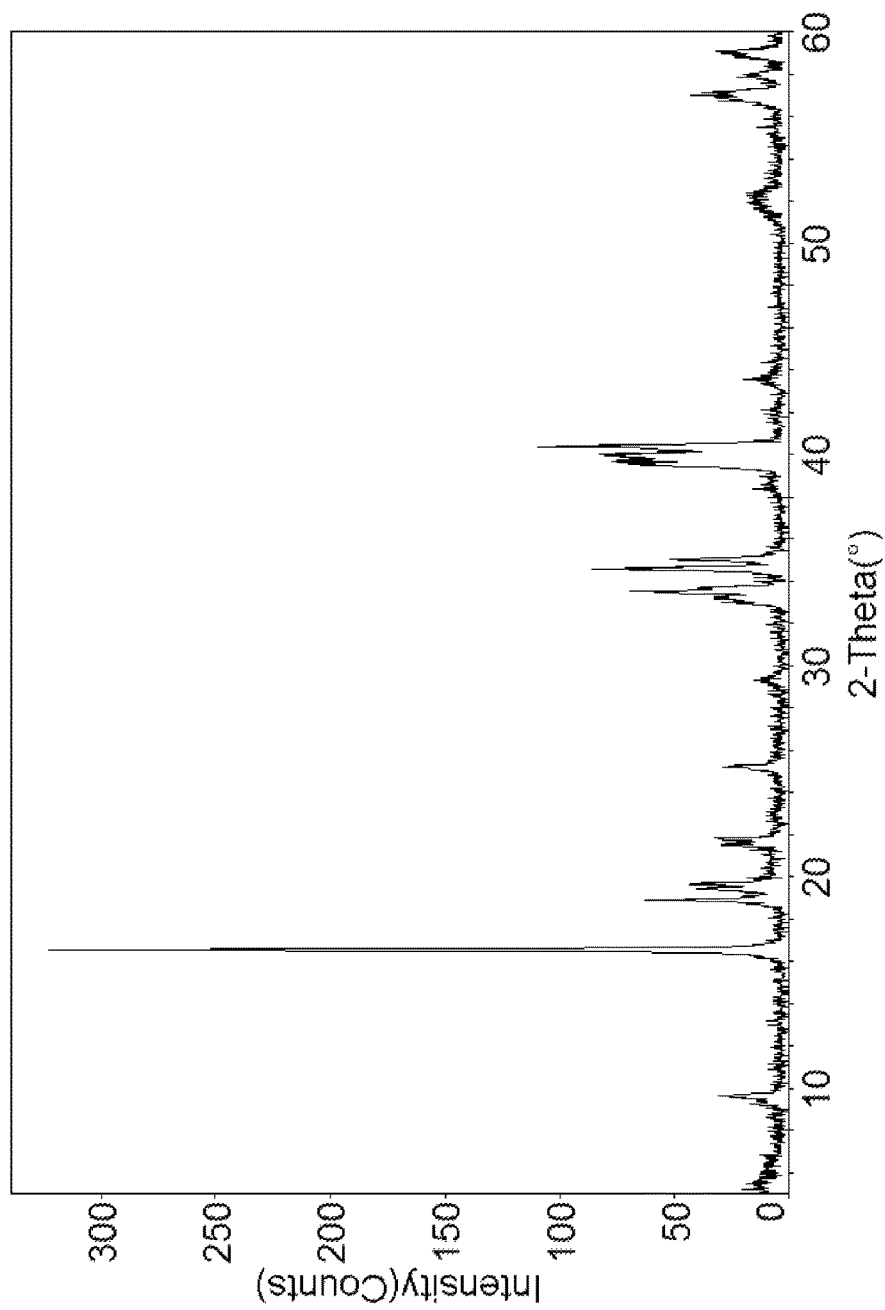
FIG. 15A is the XRD of $Na_4NiTeO_6$ prepared according to Example 40.
Figure 15B:
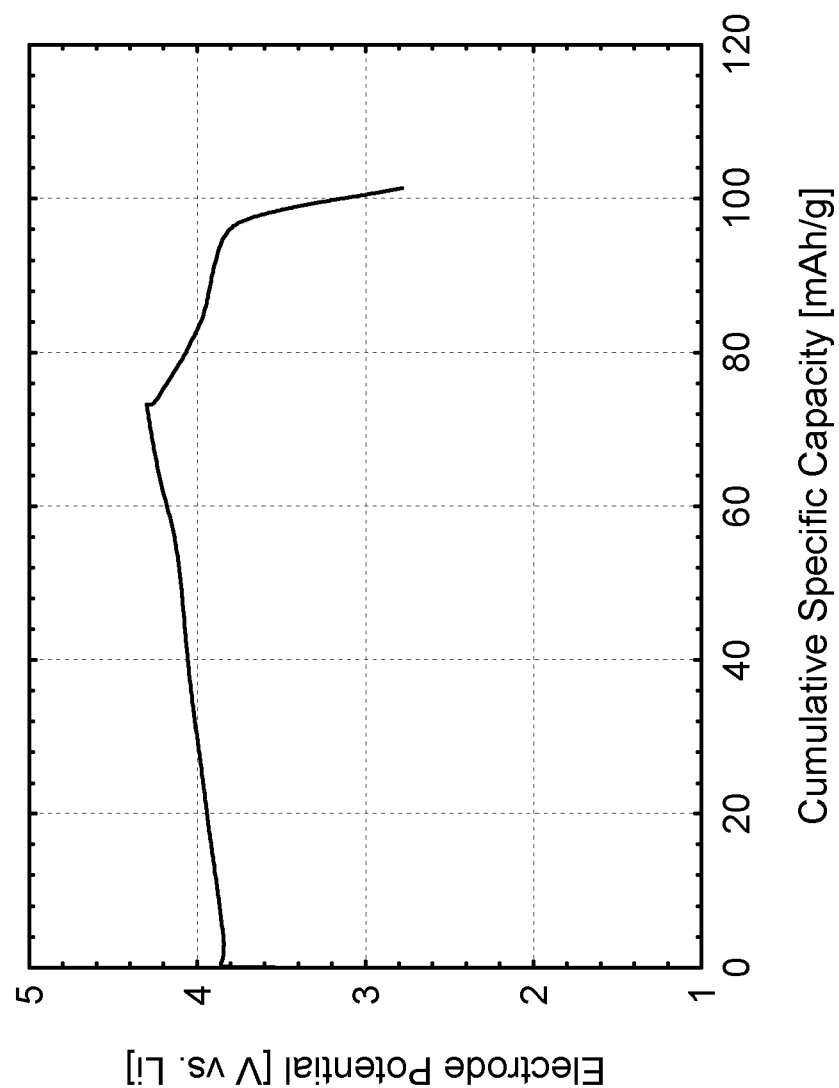
FIG. 15B shows the constant current cycling data for the $Na_4NiTeO_6$ prepared according to Example 40.

FIG. 15B (Cell #303019) shows the constant current cycling data for the $Na_4NiTeO_6$ active material (X1122). The electrolyte used a 1.0 M solution of $LiPF_6$ in ethylene carbonate (EC) and diethyl carbonate (DEC). The constant current data were collected using a lithium metal counter electrode at an approximate current density of 0.04 mA/$cm^2$ between voltage limits of 2.50 and 4.30 V. The testing was carried out at 25° C. It is shown that sodium ions are extracted from the active material during the initial charging of the cell. A charge equivalent to a material specific capacity of 75 mAh/g is extracted from the active material. The re-insertion process corresponds to 30 mAh/g, indicating the reversibility of the alkali ion extraction-insertion processes. The generally symmetrical nature of the charge-discharge curves further indicates the excellent reversibility of the system.

The invention claimed is:

1. An electrode containing an active material of the formula:

$$A_aM_bX_xO_y$$

wherein

A is one or more alkali metals selected from sodium or a mixture of sodium and potassium;

M is selected from one or more transition metals and/or one or more non-transition metals and/or one or more metalloids;

X comprises one or more atoms selected from niobium, antimony, tellurium, tantalum, bismuth and selenium;

wherein
0<a≤6; b is in the range: 0<b≤4; x is in the range 0.5≤x≤1 and y is in the range 2≤y≤10
and further wherein
M comprises one or more transition metals and/or one or more non-transition metals and/or one or more metalloids selected from titanium, vanadium, chromium, molybdenum, tungsten, manganese, iron, osmium, cobalt, nickel, palladium, platinum, copper, silver, gold, zinc, cadmium, magnesium, calcium, beryllium, strontium, barium, aluminium and boron.

2. The electrode containing an active material according to claim 1 wherein at least one of the one or more transition metals has an oxidation state of +2 and at least one of the one or more non-transition metals has an oxidation state of +2.

3. The electrode containing an active material according to claim 1 wherein at least one of the one or more transition metals has an oxidation state of either +2 or +3 and wherein at least one of the one or more non-transition metals has an oxidation state of +3.

4. The electrode containing an active material according to claim 1 wherein M is selected from one or more of copper, nickel, cobalt, manganese, aluminium, vanadium, magnesium and iron.

5. The electrode containing an active material according to claim 1 of the formula: $A_aM_bX_xO_y$, wherein A is one or more alkali metals selected from sodium or a mixture of sodium and potassium; M is one or more metals selected from cobalt, nickel, manganese, iron, copper, aluminium, vanadium and magnesium; X is one or more selected from antimony and tellurium; a is in the range 0<a≤5; b is in the range 0<b≤3; and y is in the range 2≤y≤9.

6. An electrode containing one or more active materials selected from: $Na_3Ni_2SbO_6$, $Na_3Ni_{1.5}Mg_{0.5}SbO_6$, $Na_3Co_2SbO_6$, $Na_3Co_{1.5}Mg_{0.5}SbO_6$, $Na_3Mn_2SbO_6$, $Na_3Fe_2SbO_6$, $Na_3Cu_2SbO_6$, $Na_2AlMnSbO_6$, $Na_2AlNiSbO_6$, $Na_2VMgSbO_6$, $NaCoSbO_4$, $NaNiSbO_4$, $NaMnSbO_4$, $Na_4FeSbO_6$, $Na_{0.8}Co_{0.6}Sb_{0.4}O_2$, $Na_{0.8}Ni_{0.6}Sb_{0.4}O_4$, $Na_2Ni_2TeO_6$, $Na_2Co_2TeO_6$, $Na_2Mn_2TeO_6$, $Na_2Fe_2TeO_6$, $Na_3Ni_{2-z}Mg_zSbO_6$ (0≤z≤0.75), $Na_4NiTeO_6$, $Na_2NiSbO_5$, $Na_4Fe_3SbO_9$, $Na_2Fe_3SbO_8$, $Na_5NiSbO_6$, $Na_4MnSbO_6$, $Na_3MnTeO_6$, $Na_3FeTeO_6$, $Na_4Fe_{1-z}(Ni_{0.5}Ti_{0.5})_zSbO_6$ (0≤z≤1), $Na_4Fe_{0.5}Ni_{0.25}Ti_{0.25}SbO_6$, $Na_4Fe_{1-z}(Ni_{0.5}Mn_{0.5})_zSbO_6$ (0≤z≤1), $Na_4Fe_{0.5}Ni_{0.25}Mn_{0.25}SbO_6$, $Na_{5-z}Ni_{1-z}Fe_zSbO_6$ (0≤z≤1), $Na_{4.5}Ni_{0.5}Fe_{0.5}SbO_6$, $Na_3Ni_{1.75}Zn_{0.25}SbO_6$, $Na_3Ni_{1.75}Cu_{0.25}SbO_6$ and $Na_3Ni_{1.50}Mn_{0.50}SbO_6$.

7. Use of an electrode according to claim 1 in conjunction with a counter electrode and one or more electrolyte materials.

8. Use of an electrode according to claim 1 in conjunction with a counter electrode and one or more electrolyte materials wherein the electrolyte material comprises one or more selected from an aqueous electrolyte material and a non-aqueous electrolyte material.

9. An energy storage device comprising an electrode according to claim 1.

10. A rechargeable battery comprising an electrode according to claim 1.

11. An electrochemical device comprising an electrode according to claim 1.

12. An electrochromic device comprising an electrode according to claim 1.

13. A rechargeable battery comprising an energy storage device according to claim j.

14. An electrochemical device comprising energy storage device according to claim 9.

15. An electrochromic device comprising energy storage device according to claim 9.

* * * * *